US008693582B2

(12) United States Patent
Eliezer et al.

(10) Patent No.: US 8,693,582 B2
(45) Date of Patent: Apr. 8, 2014

(54) MULTI-ANTENNA RECEIVER IN A RADIO CONTROLLED CLOCK

(71) Applicant: XW LLC, Dallas, TX (US)

(72) Inventors: Oren E. Eliezer, Plano, TX (US); Dennis I. Robbins, Richardson, TX (US); Thomas Jung, Dallas, TX (US)

(73) Assignee: XW LLC, Dallas, TX (US)

( * ) Notice: Subject to any disclaimer, the term of this patent is extended or adjusted under 35 U.S.C. 154(b) by 0 days.

(21) Appl. No.: 13/764,049

(22) Filed: Feb. 11, 2013

(65) Prior Publication Data

US 2013/0230094 A1    Sep. 5, 2013

Related U.S. Application Data

(60) Provisional application No. 61/606,758, filed on Mar. 5, 2012.

(51) Int. Cl.
*H03D 1/24*    (2006.01)

(52) U.S. Cl.
USPC ........... 375/320; 375/316; 343/788; 370/334; 370/339

(58) Field of Classification Search
USPC ............... 375/238; 13/238, 316, 320, 340; 343/787–788; 455/7, 13.3, 19, 25, 455/63.1–63.4, 82–83, 562.1, 575.7, 107, 455/121, 274; 370/334, 339
See application file for complete search history.

(56) References Cited

U.S. PATENT DOCUMENTS

| 3,406,343 A | 10/1968 | Mehlman |
| 3,648,173 A | 3/1972 | Elliott |
| 4,117,661 A | 10/1978 | Bryant, Jr. |
| 4,217,467 A | 8/1980 | Kobayashi et al. |

(Continued)

FOREIGN PATENT DOCUMENTS

| EP | 1787444 | 10/2007 |
| JP | 2008241354 | 10/2008 |

OTHER PUBLICATIONS

Lichtenecker, R. "Terrestrial time signal dissemination", Real-Time Systems, 12, pp. 41-61, Kluwer Academic Publishers, Boston MA, 1997.

(Continued)

*Primary Examiner* — Dac Ha
*Assistant Examiner* — Janice Tieu
(74) *Attorney, Agent, or Firm* — Woods Oviatt Gilman LLP; Howard Zaretsky, Esq.

(57) ABSTRACT

A novel and useful multi-antenna receiver that receives, demodulates and decodes a broadcast signal, whose modulation and encoding of time and timing information allow for reliable and power-efficient operation. The multi-antenna receiver of the present invention is adapted to eliminate or substantially reduce the reception nulls that occur in receivers having a single antenna that is placed in a fixed position. Two or more antennas are employed whereby the receiver generates a combined signal based on a combination of the individual antenna signals or selects one of the antenna signals for input to the receiver based on desired criteria such as signal-to-noise-and-interference-ratio (SNIR). This results in greater robustness of the communication link by reducing or eliminating reception nulls and by rejecting interference through the selection of the antenna for which the signal-to-interference ratio is higher. The invention includes various antenna configurations that are adapted to reuse a single core for multiple antennas or to otherwise reduce size and/or cost.

36 Claims, 14 Drawing Sheets

(56) References Cited

U.S. PATENT DOCUMENTS

| | | | |
|---|---|---|---|
| 4,500,985 | A | 2/1985 | Chang |
| 4,525,685 | A | 6/1985 | Hesselberth et al. |
| 4,562,424 | A | 12/1985 | Takagi et al. |
| 4,768,178 | A | 8/1988 | Conklin et al. |
| 4,925,299 | A | 5/1990 | Meisberger et al. |
| 5,617,102 | A * | 4/1997 | Prater .............. 342/374 |
| 5,805,647 | A | 9/1998 | Schafer et al. |
| 6,041,082 | A | 3/2000 | Takeda et al. |
| 6,101,430 | A * | 8/2000 | Fuller et al. .......... 701/13 |
| 6,124,960 | A | 9/2000 | Garthe et al. |
| 6,212,133 | B1 | 4/2001 | McCoy et al. |
| 6,295,442 | B1 | 9/2001 | Camp, Jr. et al. |
| 6,862,317 | B1 | 3/2005 | Mohan et al. |
| 6,937,668 | B2 | 8/2005 | Sridharan et al. |
| 6,947,716 | B2 * | 9/2005 | Ono ................ 455/273 |
| 7,027,773 | B1 | 4/2006 | McMillin |
| 7,215,600 | B1 | 5/2007 | DeRosa |
| 7,324,615 | B2 | 1/2008 | Lourens et al. |
| 7,411,870 | B2 | 8/2008 | Murata et al. |
| 7,636,397 | B2 | 12/2009 | McLaughlin |
| 7,719,928 | B2 | 5/2010 | Meltzer et al. |
| 7,720,452 | B2 | 5/2010 | Miyahara et al. |
| 7,738,322 | B2 | 6/2010 | Murata et al. |
| 7,750,612 | B2 | 7/2010 | Yokosawa |
| 7,956,778 | B2 | 6/2011 | Koyama |
| 7,974,580 | B2 | 7/2011 | Fagg |
| 8,300,687 | B1 | 10/2012 | Eliezer |
| 2001/0026244 | A1 * | 10/2001 | Ieda et al. ............ 343/867 |
| 2003/0169641 | A1 | 9/2003 | O'Neill et al. |
| 2004/0196926 | A1 | 10/2004 | Chien et al. |
| 2004/0233789 | A1 | 11/2004 | Oguchi et al. |
| 2004/0239415 | A1 | 12/2004 | Bishop |
| 2005/0036514 | A1 | 2/2005 | Polonio et al. |
| 2005/0073911 | A1 | 4/2005 | Barnett |
| 2005/0105399 | A1 | 5/2005 | Strumpf et al. |
| 2005/0111530 | A1 | 5/2005 | Chen et al. |
| 2005/0123083 | A1 | 6/2005 | Kawakami |
| 2005/0141648 | A1 | 6/2005 | Lourens et al. |
| 2005/0169230 | A1 | 8/2005 | Haefner |
| 2005/0175039 | A1 | 8/2005 | Haefner et al. |
| 2005/0213433 | A1 | 9/2005 | Mah |
| 2006/0140282 | A1 | 6/2006 | Kondo |
| 2006/0267853 | A1 * | 11/2006 | Naito ................. 343/788 |
| 2007/0089022 | A1 | 4/2007 | McLaughlin |
| 2007/0115759 | A1 | 5/2007 | Sano |
| 2007/0140064 | A1 | 6/2007 | Fujisawa |
| 2007/0164903 | A1 | 7/2007 | Takada |
| 2008/0049558 | A1 | 2/2008 | Shimizu |
| 2008/0095290 | A1 | 4/2008 | Leung |
| 2008/0107210 | A1 | 5/2008 | Haefner |
| 2008/0198082 | A1 | 8/2008 | Soler Castany et al. |
| 2008/0239879 | A1 | 10/2008 | Someya |
| 2009/0016171 | A1 | 1/2009 | Fujisawa |
| 2009/0054075 | A1 | 2/2009 | Boejer et al. |
| 2009/0122927 | A1 | 5/2009 | Walton et al. |
| 2009/0125740 | A1 * | 5/2009 | Ragan et al. ........... 713/323 |
| 2009/0254572 | A1 | 10/2009 | Redlich et al. |
| 2009/0274011 | A1 | 11/2009 | Fujisawa |
| 2011/0051561 | A1 | 3/2011 | Fujisawa |
| 2011/0084777 | A1 | 4/2011 | Wilhelm |
| 2011/0102274 | A1 | 5/2011 | Fujisawa |
| 2011/0129099 | A1 | 6/2011 | Fagg |
| 2012/0082008 | A1 | 4/2012 | Eliezer et al. |

OTHER PUBLICATIONS

Cherenkov, G.T. "Employment of phase modulation to transmit standard signals", Plenum Publishing Corporation, 1984.

Allen, K.C., Analysis of Use of 10 or 20 dB Amplitude Shifting for WWVB at 60 kHz, National Telecommunication & Information Administration, Apr. 25, 2005.

Chen, Yin et al., Ultra-Low Power Time Synchronization Using Passive Radio Receivers, IPSN '11, Apr. 12-14, 2011.

Deutch, Matthew et al., WWVB Improvements: New Power from an Old Timer, 31st Annual Precise Time and Time Interval (PTTI) Meeting, Dec. 7-9, 1999.

Tele Distribution Francaise, http://en.wikipedia.org/Tele_Distribution_Francaise, Dec. 11, 2011.

Hetzel, P., Time Dissemination via the LF Transmitter DCF77 using a Pseudo-Random Phase-Shift Keying of the Carrier, 2nd EP Freq & Time Forum, Session TF-05, No. 3, Mar. 16, 1988.

DCF77, http://en.wikipedia.org/wiki/DCF77#Phase_modulation, Jan. 12, 2012.

Lombardi, Michael A., Radio Controlled Clocks, NIST Time and Frequency Division, NCSL International Workshop and Symposium, 2003.

Lowe, J. et al., Increasing the Modulation Depth of the WWVB Time Code to Improve the Performance of Radio Controlled Clocks, Int'l Freq Control Symp & Expo, IEEE, Jun. 2006.

Lombardi, Michael A., NIST Time and Frequency Services, NIST Special Publication 432, Jan. 2002 Edition.

Lombardi, Michael S. et al., WWVB Radio Controlled Clocks: Recommended Practices, Special Publication 960-14, 2009 Edition.

US Dept of Commerce, NIST, FY 2010 Small Business Innovation Research Program Solicitation, NIST-10-SBIR, Oct. 30, 2009-Jan. 22, 2010.

Piester, D. et al., PTB's Time and Frequency Activities in 2006: New DCF77 Electronics, New NTP Servers, and Calibration Activities, Proc. 38th Annual PTTI Mtg, Dec. 5-7, 2006.

Bauch, A. et al., PTBM, Special Topic—50 Years of Time Dissemination with DCF77, Special Issue, vol. 119 (2009), No. 3.

Lowe, John, We Help Move Time Through the Air, RadioWorld, vol. 35, No. 8, Mar. 23, 2011.

WWVB, http://en.wikipedia.org/wiki/WWVB, Dec. 25, 2011.

Sumida Corporation, Coil Specifications No. S-0074-6818, pp. 1-6, Jul. 14, 2008.

Sumida Corporation, Coil Specifications No. S-0074-6817 pp. 1-4, Jul. 11, 2008.

* cited by examiner

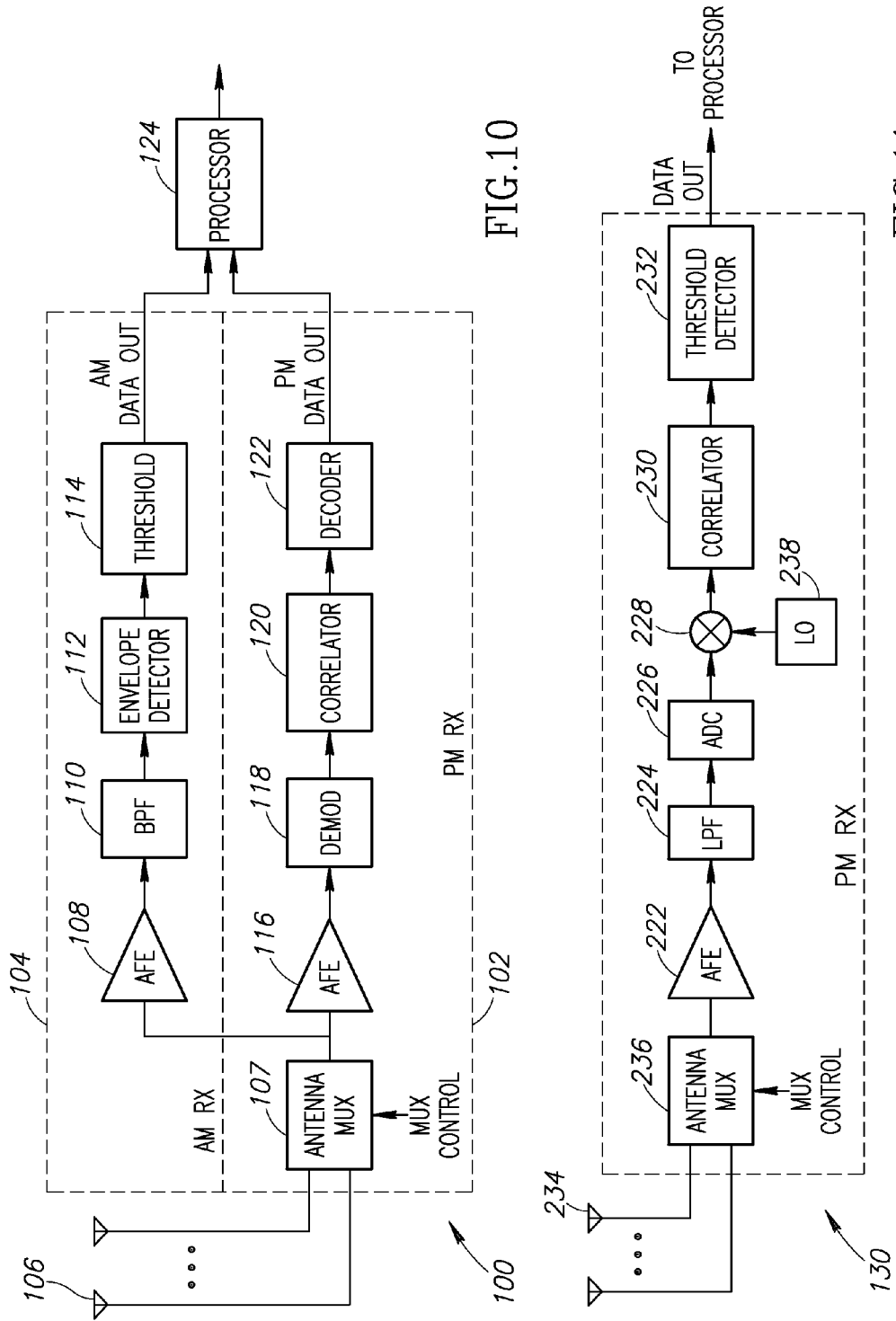

MULTI-ANTENNA RECEIVER IN A RADIO CONTROLLED CLOCK

REFERENCE TO PRIORITY APPLICATION

This application claims priority to U.S. Provisional Application Ser. No. 61/606,758, filed Mar. 5, 2012, entitled "Multi-Antenna Receiver and Method of Operation Thereof for a Radio Controlled Clock," incorporated herein by reference in its entirety.

STATEMENT OF GOVERNMENT INTEREST

This invention was made with Government support under National Institute of Standards and Technology under SBIR Grant No. NB401000-11-04154. The Government has certain rights in the invention.

FIELD OF THE INVENTION

The present invention relates to the field of wireless communications, and more particularly relates to a multi-antenna receiver for use in a radio controlled clock receiver.

BACKGROUND OF THE INVENTION

Radio-controlled-clock (RCC) devices that rely on time signal broadcasts have become widely used in recent years. A radio-controlled-clock (RCC) is a timekeeping device that provides the user with accurate timing information that is derived from a received signal, which is broadcast from a central location, to allow multiple users to be aligned or synchronized in time. Colloquially, these are often referred to as "atomic clocks" due to the nature of the source used to derive the timing at the broadcasting side. In the United States, the National Institute of Standards and Technology (NIST) provides such broadcast in the form of a low-frequency (60 kHz) digitally-modulated signal that is transmitted at high power from radio station WWVB in Fort Collins, Colo. The information encoded in this broadcast includes the official time of the United States.

Similar services operating at low frequencies exist in other regions worldwide, including Germany and Japan. Many consumer-market products exist, including watches, alarm clocks and wall clocks, that are capable of receiving one or more of these broadcasts and which can display the correct time to within approximately one or two seconds of accuracy. While the broadcast may be active continuously, a typical radio-controlled clock may be set to receive the broadcast only once a day. Such reception, if successful (depending on the condition of the wireless link and potential interference), is typically used to reset the timekeeping device, such that if it were set incorrectly or has drifted away from the correct time, it will be set in accordance to the time communicated through the broadcast signal.

Reception of the time signal, however, is being challenged by a growing number of sources of electromagnetic interference. In particular, the on-frequency interference from the MSF radio station in the United Kingdom has been identified as a particularly challenging jammer for receivers on the East Coast.

The frequency of operation of WWVB is 60 kHz, for which the receiving antenna is typically an inductor based on a ferrite rod. The ferrite rod antenna structure, being based on multiple loops wrapped around the ferrite core, offers maximal signal pick-up when the rod is placed in the magnetic field, such that flux flows through the rod, allowing current to be induced into the loops in accordance with Faraday's law of induction.

When the rod is tilted (i.e. placed off axis) with respect to the direction of the magnetic flux, however, a loss whose magnitude corresponds to $\cos \theta$ is experienced, where $\theta$ represents the angle by which the rod deviates from the optimal direction. The optimal orientation is when the rod is oriented broadside with respect to the transmitter, since a vertical radiating element is used for the broadcast antenna in Fort Collins, which results in vertical polarization.

It is noted that when the antenna's orientation is perpendicular to the optimal orientation, a null is experienced for which, theoretically, the magnitude of the signal induced in the antenna would be zero. This results in a total loss of reception.

Many users of radio controlled clocks are not aware of the antenna in their products, and/or not aware of the antenna's orientation and its significance, and consequently do not orient them in the optimal direction. Thus, significant losses might be experienced that could result in loss of reception.

Statistical analysis, based on the known probability-density-function (PDF) of the cosine function, shows that these losses may exceed 15 dB with a probability of 11%, which means that one out of nine users experiences losses higher than 15 dB, when assuming uniformly distributed angles of orientation amongst the many users.

There is thus a need for an improved antenna scheme for reception of time signal broadcasts such as that provided by WWVB in the United States and radio stations in other countries that cost-effectively addresses the above outlined reception challenges.

SUMMARY OF THE INVENTION

The present invention offers a novel and useful solution to the problem of antenna directionality in radio-controlled-clock (RCC) receivers, where the commonly used antennas are based on a loop structure, having an antenna pattern in the shape of the number '8' with nulls in two opposite directions. If the broadcast is received from either of these directions, great losses may be experienced, which the present invention overcomes by introducing at least one more antenna that offers sufficient gain in the direction of those nulls.

Various embodiments of the invention include different antenna structures, including a printed antenna, an air-core antenna and structures wherein a common ferrite core is shared amongst multiple windings that represent multiple antennas that are positioned substantially perpendicularly to each other.

Additionally, in one embodiment of the invention, capacitors that represent part of the resonant circuit that is designed to resonate with the antennas' inductances, are embedded within the common core, such that they would not need to be added to the antenna on the printed circuit board (PCB) or within the receiver IC.

The present invention includes a novel receiver structure, having multiple antennas, as well as a reception method for ensuring acceptable reception quality, wherein a signal from a preferred antenna is selected or a combination of signals from multiple antennas is used.

There is therefore provided in accordance with the invention, a radio receiver, comprising a plurality of antennas each adapted to receive a broadcast signal and generate an antenna signal therefrom, antenna signal combining means operative to generate an antenna output signal from said plurality of antenna signals, and a receiver circuit operative to receive said antenna output signal comprising a pulse width modulation (PWM)/amplitude shift keyed (ASK) time-code broadcast signal.

There is also provided in accordance with the invention, a radio receiver method, said method comprising providing a plurality of substantially-orthogonally positioned antennas, each antenna adapted to receive the same broadcast signal and generate an antenna signal therefrom, generating a combined antenna output signal from said plurality of antenna signals, receiving said antenna output signal comprising a pulse width modulation (PWM)/amplitude modulated, time-code broadcast signal encoded which may be additionally modulated with time information frames, and extracting said time-code or said time information frames from said received signal.

There is also provided in accordance with the invention, a radio receiver, comprising a first antenna adapted to receive a broadcast signal a second antenna adapted to receive said broadcast signal, said second antenna oriented substantially orthogonal to said first antenna, a receiver circuit operative to receive a signal from said first antenna and said second antenna comprising a broadcast signal encoded with time information frames, and a frame extractor operative to extract said time information frames from said received signal.

BRIEF DESCRIPTION OF THE DRAWINGS

The invention is herein described, by way of example only, with reference to the accompanying drawings, wherein:

FIG. 10 is a high level block diagram illustrating an example combined AM and PM receiver with multiple antennas;

FIG. 11 is a high level block diagram illustrating an example PM only receiver with multiple antennas;

DETAILED DESCRIPTION OF THE INVENTION

Figure 1:
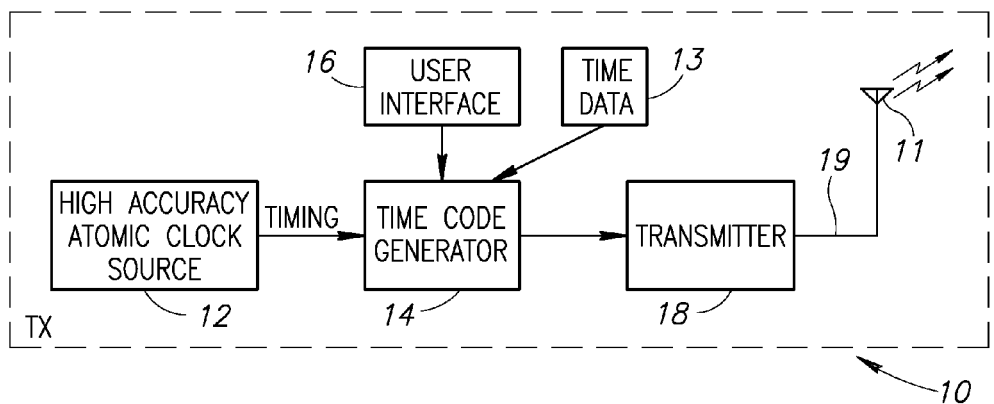
FIG. 1 is a high level block diagram illustrating an example timing and time information transmitter of a system operating in accordance with the present invention.

The system and method of the present invention is a multi-antenna receiver that receives, demodulates and decodes a broadcast signal, whose modulation and encoding of time and timing information allow for reliable and power-efficient operation. The multi-antenna receiver of the present invention is adapted to eliminate or substantially reduce the reception nulls that otherwise would occur due to the fixed position of a receiver device. The advantages include insensitivity to the orientation at which a device is positioned and, consequently, the flexibility to position RCC devices at any orientation convenient to the user without compromising performance. In stationary devices, such as microwave ovens and wall clocks, there may not be any flexibility in positioning the device for optimal reception, as its location and position may be dictated by other practical considerations associated with its normal use. The invention thus allows for greater reliability in providing the correct time in RCC applications, and reduced energy consumption associated with the more efficient extraction of the received signal from the antenna where it is received at higher SNIR, resulting in extended battery life in battery-operated devices.

In accordance with one embodiment of the present invention, only phase modulation is added to the carrier thus allowing existing devices that operate in accordance with the legacy communication protocol and rely on envelope-detection based AM demodulation to continue to operate with the modified protocol without being affected. Although this backward compatibility property of the communication protocol of the present invention may represent a practical need when upgrading an existing system, the scope of the invention is not limited to the use of this combined modulation scheme and to operation in conjunction with an existing communication protocol.

Legacy receivers are typically adapted to receive the legacy pulse width modulated/amplitude modulation through relatively simple envelope detection, which is unaffected by the phase modulation of the present invention. This is because there are no phase transitions introduced during the high-amplitude portion pulses, which could result in bandwidth expansion and consequently in reduced power passing through the narrowband filtering used in these receivers.

The enhanced robustness offered by the present invention is a result of the use of multiple receive antennas that serve to alleviate the reception losses experienced in single-antenna devices due to sub-optimum antenna orientation. Furthermore, the present invention increases the likelihood that an RCC device based on it can avoid an interfering signal that may be stronger in one antenna than in another. If, for example, an interfering signal arrives from a direction to which one antenna is oriented, while a second antenna, substantially perpendicular to the first, presents a null in that direction, then it is beneficial to receive the broadcast through the second antenna, even if it is slightly weaker there, in order to avoid the strong interferer and present the receiver input with a higher SNIR.

The time information recovered from the signal received through the antenna is typically used in a radio-controlled-clock (RCC) device to either initialize or track the time in the application based on the RCC. Note that this information, at least initially, may be made available to the application from sources other than the broadcast, such as through factory setting, manual setting by the user, or some form of conveying the time to the application either wirelessly or through a physical connection that alleviates the need to receive this information from the broadcast signal. Such means for initializing the time in the application are particularly beneficial in scenarios where the reception of the broadcast may be marginal and the recovery of such information from it may be difficult, whereas time-tracking, based on correlating against the known synchronization word in the frame, is possible even at much lower SNIR values.

Note that an RCC receiver incorporating the system and methods of the present invention may be implemented in any type of timekeeping device. The timekeeping device may comprise a watch; an alarm clock; a wall clock, a utility meter; a microwave oven; a car radio that can display the time; a timekeeping device that acquires its initial timing (sets its time) based on the reception of a phase-modulated data frame, and a device that acquires its initial timing (i.e. sets its time) based on the reception of an amplitude-modulated data frame of the type used by broadcast stations such as DCF77 in Germany.

A high level block diagram illustrating an example timing and time information transmitter system operating in accordance with the present invention is shown in FIG. 1. The equipment at the transmitter end, generally referenced 10, comprises a high accuracy clock source (frequency source) 12 from which a clock signal (timing information) is derived, a time-code-generator 14 having user-interface 16, a source of time data 13, a transmitter 18 generating a TX signal 19 and coupled to transmitting antenna 11.

The time code generator 14 keeps track of time based on the high-accuracy frequency source input to it from source 12, constructs the frames of data representing the time information received from time data source 13 and other information that is to be transmitted, modulates the data frames onto the RF carrier in accordance to a defined protocol and allows time initialization and other controls to be set in it through its user interface 16. The transmitter 18 amplifies the modulated signal to generate an output TX signal 19 at the desired levels, e.g., 50 kW, and drives the antenna 11 that is used for the wide-coverage omnidirectional broadcasting of the signal.

Figure 2:
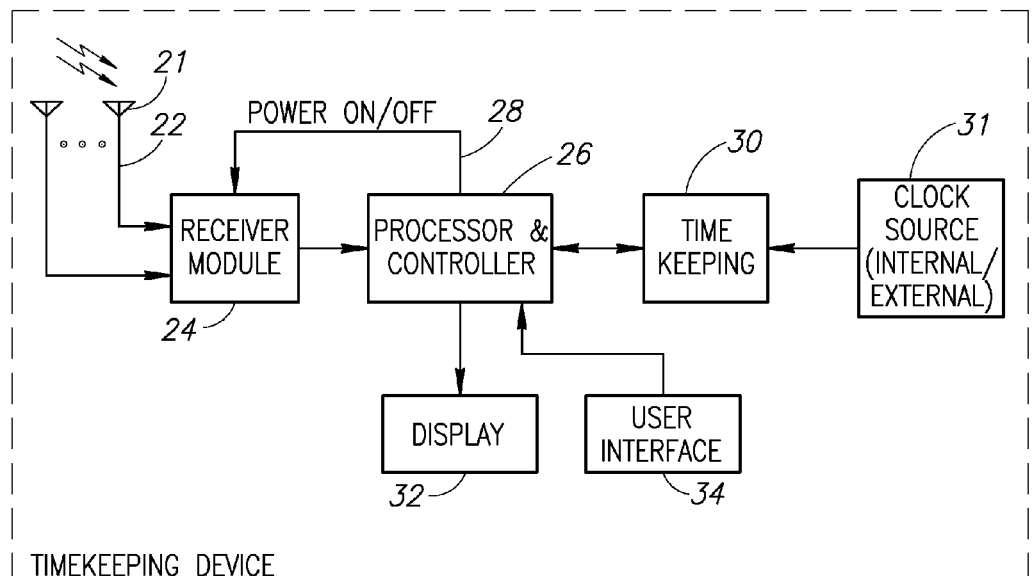
FIG. 2 is a high level block diagram illustrating an example timing and time information receiver having multiple antennas constructed in accordance with the present invention.

A high level block diagram illustrating an example timekeeping device comprising multiple antennas constructed in accordance with the present invention is shown in FIG. 2. Typically, the timekeeping device is incorporated into low cost consumer market products, but may be implemented in any device that requires a precision time reference. The timekeeping device, generally referenced 20, comprises a plurality of receiving antennas 21, receiver module 24 operative to receive RX signals 22, processor and controller 26, timekeeping function 30, internal or external clock source 31, display 32 and user interface 34.

In one embodiment, the timekeeping RCC device, which may be based on phase or other types of modulation, is fabricated using CMOS technology and may be incorporated into a larger SoC that could comprise functionality beyond that of the RCC and timekeeping functions.

In one embodiment, a selection criterion is applied and one of the signals received from one of the multiple antennas is selected for input to the receiver module. Alternatively, the multiple antenna signals are combined using well-known signal processing techniques to generate a single received signal that is input to the receiver. In operation, the receiver module 24 extracts timing and time information from the one or more received signals 22, in accordance with the modulation scheme and protocol in use, and provides the processing and control function 26 with the extracted timing and time information. Controller function/processor 26 appropriately enables/disables the operation of the receiver module through control line 28 such that it is limited to the intervals of interest to minimize energy consumption in those applications where it may be critical to do so (e.g., wrist watches). The processor/controller and/or the receiver module functions to determine the selection or combination of antenna signals for input to the receiver module. The timekeeping function 30 keeps track of the time based on pulses provided by clock source 31 having limited accuracy. Note that the clock source 31 may comprise any suitable clock source or clock signal, such as a crystal oscillator, and may be provided internal to the timekeeping device 20 or supplied from a source external to the timekeeping device.

The timekeeping may be adjusted by the processor/controller in accordance with an estimated drift at a specific instant, which is either measured or calculated or a combination of the two. The display function 32 may be used to display the time, as well as various indications to the user, including reception quality, the selected antenna, estimated bound for error in displayed time, battery status, etc. The user interface function 34, based on pushbuttons, slide-switches, a touch-screen, keypad, computer interface, a combination therefrom, or any other form of human interface, may be used to set the initial time, define the maximal allowed timing error, the time-zone according to which time is to be calculated, the use of daylight saving time, etc.

In one embodiment of the invention, the timekeeping device is operative to extract timing and time information conveyed in a broadcast signal. Timing information denotes information related to synchronization and tracking and is also used for bit and frame synchronization. Time information denotes information related to the current time being communicated, such as the date and the time of day (hours and minutes), as well as scheduled events, such as an upcoming DST transition, leap second, etc.

Typical currently available time-broadcast signals employ some form of amplitude modulation combined with some form of pulse width modulation (PWM) to send binary data bits. As an example consider the WWVB signal broadcast from Fort Collins, Colo. in the United States of America. The WWVB signal comprises a 60 second frame consisting of 60 bits. Each bit, of one second duration, is sent as a pulse width modulated signal wherein the carrier is transmitted at a low amplitude or a high amplitude for different portions of the bit. The frame also consists of several marker bits spread out evenly through the frame, which serve only to indicate timing and do not convey time information. The legacy WWVB system transmitted a pulse-width modulated amplitude-shift keyed waveform on a 60 kHz carrier, in which the one-second duration '0' and '1' symbols were represented by a power reduction of −17 dB at the start of the second for 0.2 s and 0.5 s, respectively. This broadcast signal has been enhanced to include phase modulation that is combined with the AM/PWM modulation to allow for a more robust communications link.

The present invention may be utilized in a RCC operating in accordance with the legacy type of modulation, i.e. without phase modulation, and may also comprise a digital phase modulation (PM) receiver operative to perform phase demodulation on a signal that comprises both phase modulation and amplitude modulation, such as the enhanced WWVB signal currently being broadcast. The low level may be zero, thus reducing the amplitude modulation to on-off-keying (OOK). The symbol time may be one second and the low-level portion of the transmitted symbol is its first 0.1 seconds, 0.2 seconds, 0.5 seconds, or 0.8 seconds. The phase demodulation operation may be limited to a fixed portion of the symbol that is expected to have the high amplitude. The fixed portion may be the second half of the symbol, thus simplifying the receiver implementation. The duration of the portion of high-amplitude may be predicted based on the knowledge of the exact time, allowing the receiver to time its demodulation duration to the portion of the symbol that is of high amplitude, thus maximizing the energy involved in the phase demodulation operation. Further the phase modulation may comprise, for example, binary phase shift keying (BPSK), minimum-phase-shift-keying (MSK), phase reversal keying (PRK), quadrature phase shift keying (QPSK), and frequency shift keying (FSK).

Figure 3:
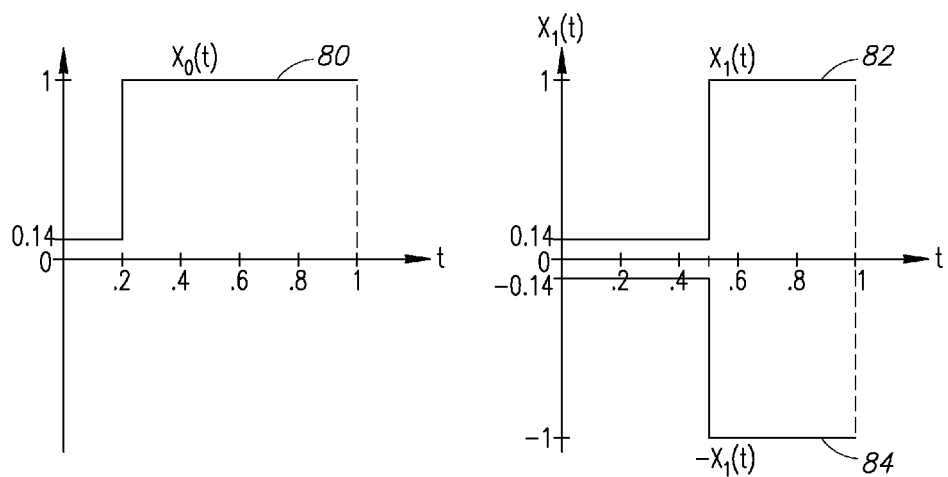
FIG. 3 is a diagram illustrating an example embodiment of phase modulation, shown at baseband, added to a pulse width amplitude modulated carrier.

In one embodiment of the invention, phase modulation is added to an amplitude modulated carrier. A diagram illustrating phase modulation added to an amplitude modulated carrier in an example communication protocol is shown in FIG. 3. This diagram describes the amplitude/pulse width modulation (PWM) used in the historical WWVB broadcast as well as the phase modulation introduced in accordance with an embodiment of the present invention. The diagram shows the baseband representation of the '0' and '1' symbols in both the historical WWVB modulation and in one that is modified in accordance with an example embodiment of the present invention. It is noted that the enhancement in the communication protocol offered by the present invention, in the form of independently defined phase modulation and the use of a known synchronization sequence, is not limited to the broadcast of WWVB and may be applied to other timing/time information broadcast systems such as those in other countries around the world where similar AM/pulse-width schemes are used or where no AM/pulse-width modulation needs to be supported, allowing for continuous BPSK to be used. Note that the receiver may be operative to receive and decode any phase over amplitude modulated transmitted signal that has time synchronization and time information conveyed therein.

In one embodiment, the additional phase modulation added to the signal is binary phase shift keying (BPSK) having an 180° difference in the carrier's phase between the '0' and '1' symbols, also known as antipodal phase modulation or Phase Reversal Keying (PRK). Hence, the modulated waveforms representing these symbols may be expressed as the products of the sinusoidal 60 kHz carrier (in the case of WWVB) and the baseband waveforms $s_0(t)=x_0(t)$ (waveform 80) and $s_1(t)=x_1(t)$ (waveform 84), respectively, as shown in FIG. 3. Waveform 82 represents the original '1' symbol $s_1(t)=x_1(t)$ that is replaced by its inverse waveform 84 in one example embodiment of the present invention. As is shown in FIG. 3, the enhanced modulation scheme can be accomplished through simple sign inversion for the waveform representing the '1' symbol. It is noted that since the existing envelope detector based receivers designed to receive and decode the current WWVB AM/PWM based broadcast signal do not consider the carrier's phase, they are not impacted by the modification of phase inversion of the '1' symbol.

Figure 4:
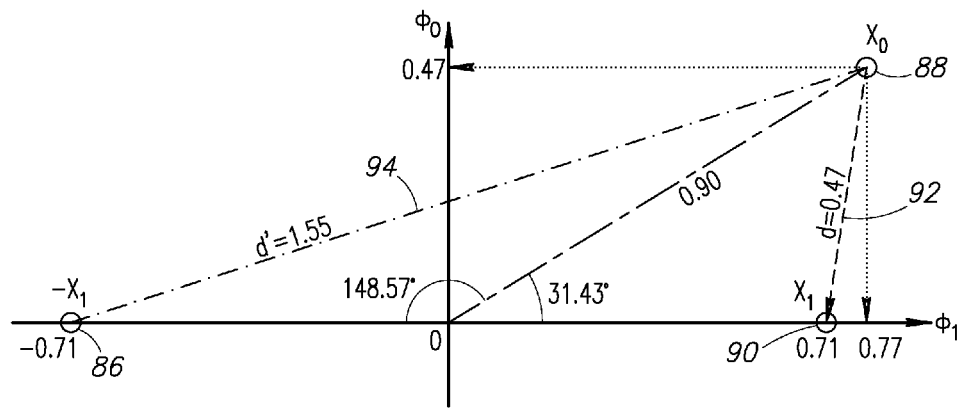
FIG. 4 is a diagram illustrating the signal space representation of the prior art AM/pulse-width '0' and '1' signals, as well as that of an example embodiment of the present invention, where Phase-Reversal-Keying (PRK) is added onto the AM/pulse-width modulation.

A diagram illustrating the signal space representation of AM only and PM over AM '0' and '1' symbols is shown in FIG. 4. As shown in the diagram, the new pair of waveforms, $x_0$ (referenced 88) and $-x_1$ (referenced 86), having the same amount of energy (corresponding to their distances from origin), exhibit a much greater distance between the '0' and '1' symbols (as compared to waveform pair $x_0$ and $x_1$ (referenced 90), thereby allowing for more robust reception in the presence of additive noise. Note that the existing symbols $x_0$ and $x_1$ are strongly correlated, i.e. they have a very short distance between them in the signal space with respect to their energies.

The Euclidean distance between the two amplitude modulated waveforms $x_0$ and $x_1$ is shown to be 0.47, whereas the Euclidean distance for the two phase modulated waveforms $x_0$ and $-x_1$ increases to 1.55. Therefore, the modulation gain (denoted $m_g$) representing the power ratio by which the detection capability in the presence of additive noise is improved, is given by $$m_g = 20\log_{10}\left(\frac{1.55}{0.47}\right) \quad (1)$$
$$= 10.36 \text{ dB}$$

Thus, by simply adding such phase modulation, an order of magnitude of improvement may be achieved when assuming additive white Gaussian noise (AWGN). This analysis implicitly assumes that the receivers for both schemes would be optimal, i.e. based on correlation or matched filtering. In practice, the BPSK receiver may be implemented digitally in a near-optimal fashion, whereas the receivers for the existing AM/pulse-width scheme found in consumer-market products, not designed as a classical digital-communications system, are based on envelope detection, as previously noted. This adds an additional gap of 2 to 4 dB between the two when only AWGN is considered. In the presence of on-frequency interference, however, the gain offered by realizing a near-optimal BPSK receiver may be arbitrarily higher. Furthermore, additional gains can be offered, such as (1) through encoding of the information, and (2) use of a known synchronization sequence.

In an embodiment of the present invention, the information represented by the phase modulation in each bit is independent from that represented by the existing (legacy) AM/pulse-width modulation, such that an inverted phase would not necessarily be tied to the shorter waveform 82, represented by inverted waveform $-x_1(t)$ 84 in FIG. 3. In an example embodiment, with independent data being communicated through the carrier's phase, a phase inverted bit, which may represent a "1", for example, may be combined with either a "0" or a "1" in the AM/PWM signal.

The receiver extracting the information from the phase may limit the phase demodulation operation to the last 0.5 sec of each bit, where both the "0" and "1" symbols of the AM/PWM scheme shown in this example are at high amplitude. Alternatively, in order to gain from the additional energy in the longer "0" pulses (0.8 sec in this example), the receiver may extend the demodulation of phase during those symbols to 0.8 sec when the content is of the AM/PWM modulation is known to be "0". In the existing WWVB protocol, for example, there are several such bits fixed at "0". Additionally, when a device operating in accordance with the present invention has already acquired the time and is tracking it, its reception of the phase modulated information may consider the predicted durations of the time-information bits as they are defined by the particular AM/PWM protocol, thereby further optimizing reception.

In an alternative embodiment, non-antipodal phase modulation can be used to modulate the PWM signal. For example, the magnitude of phase modulation applied may be set at any value less than 180°, e.g., ±45°, ±25°, ±13°, etc. Use of a lower value such as ±13° ensures that the modulated signal, even if the rate of phase modulation were significantly increased, is contained within a narrow bandwidth and does not escape the narrow filtering in typical existing AM receivers, which is on the order of 10 Hz. Note that such narrowband PM is not comparable in performance to antipodal BPSK, where the two symbols are 180° apart exhibiting a correlation factor of −1.

A diagram illustrating a first example phase modulation added to an amplitude modulated carrier in an example communication protocol is shown in FIG. 5A. The waveform illustrates three consecutive example bits in the transmission as a time-domain waveform 150. The three bits 152, 154 and 156 each span a duration of one second. Each of the one second bits is divided into a first portion 160 for which the carrier power is low and a second portion 162 for which the carrier power is high. In the WWVB protocol, the information in each bit depends on the durations of these two portions with an even 0.5/0.5 sec partition representing a "1" bit, and the uneven 0.2/0.8 sec partition representing a "0" bit. A 0.8/0.2 sec partition represents a 'marker' bit, which may be used for timing identification, but does not carry information. The bits represented under the legacy PWM/AM modulation are indicated at the top portion of the diagram. For example, the three PWM/AM bits shown are "1", "0" and "1".

In accordance with an embodiment of the present invention, information is added to the existing modulation using BPSK modulation. A "1" is represented by a carrier having an inverted phase, with the phase inversion 158 occurring at the beginning of the bit, as shown for the third bit 156 at t=2 sec. It is noted that the phase inversion may also be performed at any other instance, e.g., during the low amplitude portion of the carrier, if the receiver's phase demodulation operation is limited to the high-amplitude duration and disregards the low amplitude portion. While the information represented by the pulse widths is shown to be "1", "0", "1", the information that is sent in parallel, in accordance with the example BPSK (or PRK) protocol of the present invention, is shown to be "0", "0", "1" (as shown along the bottom portion of the diagram). Note that there is not necessarily any relationship between the bit pattern transmitted using PWM/AM and that transmitted using PM as they can be completely independent. It is noted that the carrier frequency is not shown to scale in the figure to enhance clarity, but it is preferable for the phase transitions to occur at zero crossing instances of the carrier.

A diagram illustrating a second example phase modulation added to an amplitude modulated carrier in an example communication protocol is shown in FIG. 5B. The waveform illustrates four consecutive example bits in the transmission as a time-domain waveform 151. The four bits each span a duration of one second. Each of the one second bits is divided into a first portion for which the carrier power is low and a second portion for which the carrier power is high. The bits represented under the legacy PWM/AM modulation are indicated in waveform 153 in the middle portion of the diagram. For example, the three PWM/AM bits shown are "0", "1", "0" and "1". The same bit pattern is represented in the phase modulation over PWM/AM waveform 155 shown in the lower portion of the diagram. As shown, the phase of the carrier is inverted for the "1" bits. Note that the data transmitted using legacy PWM/AM may be completely independent of the data transmitted using PM. In this example they are the same.

Figure 5:
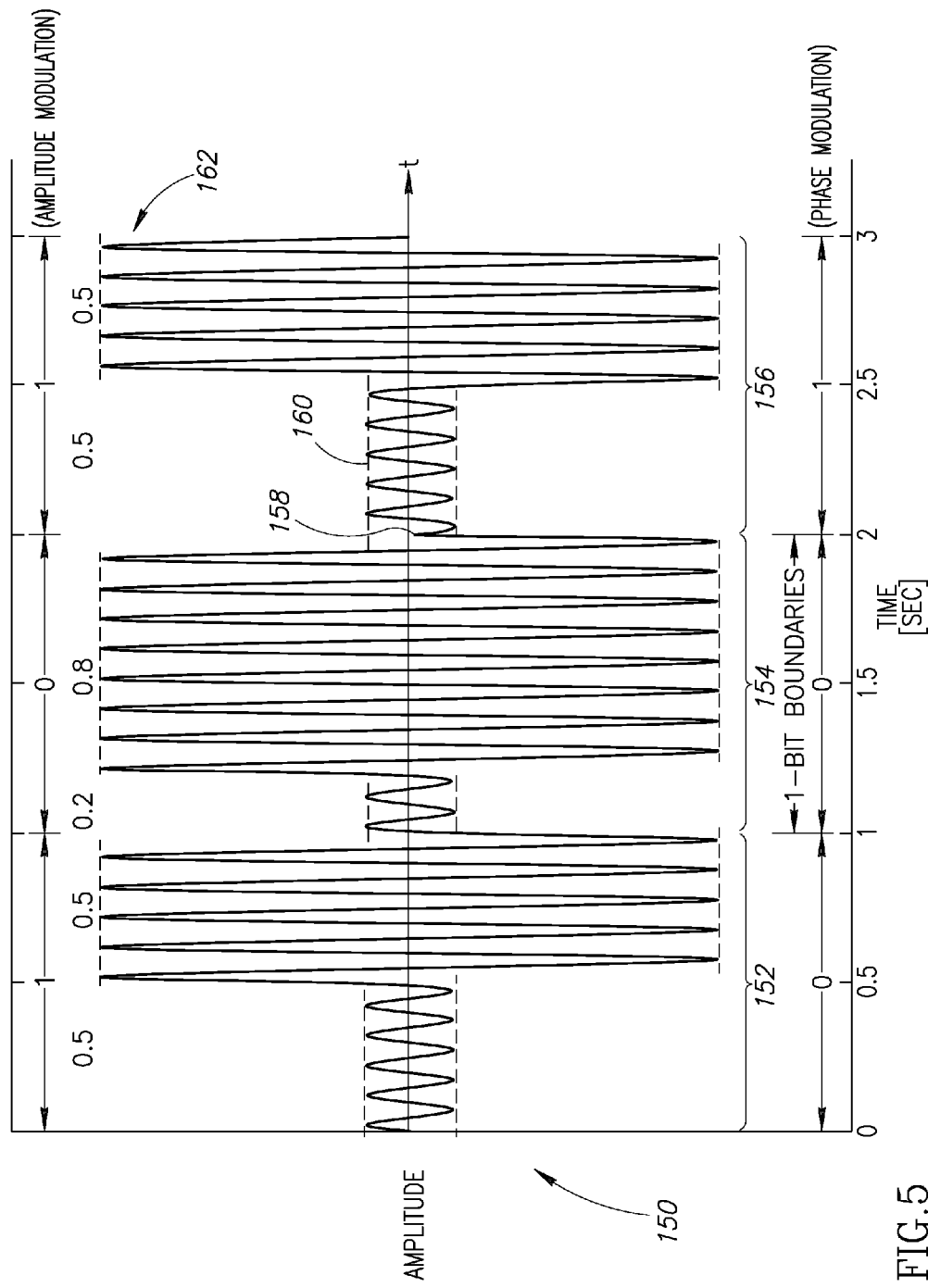
FIG. 5 is a diagram illustrating a first example waveform of phase modulation added to an amplitude/phase modulated carrier in an example communication protocol.

The diagram in FIG. 5 describes the amplitude/pulse-width modulation used in the historical WWVB broadcast, as well as the phase-modulation introduced in accordance with the present invention. It is noted that the enhancement in the communication protocol offered by the present invention, in the form of independently defined phase modulation and the use of a known synchronization sequence, is not limited to the broadcast of WWVB and may be applied worldwide, where similar AM/pulse-width schemes are used or where no AM/pulse-width modulation needs to be supported, allowing for continuous BPSK to be used.

The phase modulation added to the amplitude modulation may comprise any suitable type of phase modulation including, for example, BPSK, DBPSK, PRK, PM, MSK, and FSK. In addition, the underlying amplitude modulation may comprise any type of amplitude modulation, including, for example, ASK, AM, SSB, QAM, pulse position modulation (PPM), pulse width modulation (PWM), OOK, and ASK.

Figure 6:
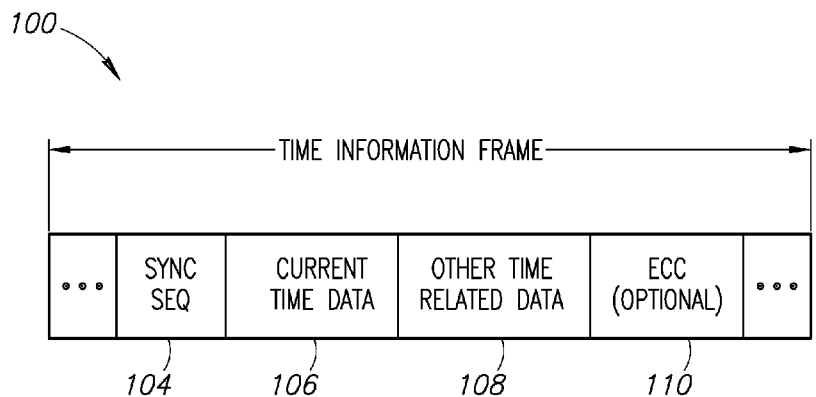
FIG. 6 is a diagram illustrating a first example time information frame structure incorporating timing, time and additional information.

A diagram illustrating a first example time information frame structure incorporating timing, time and additional information is shown in FIG. 6. The time information frame, generally referenced 100, comprises a synchronization sequence field 104, a current time data field 106, other time related data field 108 and optional error correction code (ECC) field 110. In one embodiment, each time information frame spans 60 seconds. Frames having other durations are possible as well.

The synchronization sequence field 104 comprises a known synchronization sequence (e.g., barker code, modified barker code, pseudo random sequence, or any other known word or bit/symbol sequence) at a known timing within the one minute time information frame of 60 bits that is transmitted every 60 seconds. Note that in alternative embodiments the synchronization sequence may be placed within a frame N such that it overlaps or straddles the frame N−1 before it or frame N+1 after it.

The current time data field 106 may consist of a merged date and time of day field or may be broken down into individual sub-fields used to indicate date, year, hours, minutes, etc. The other time related data field 108 may include zero or more fields used to indicate, daylight savings time start, leap second information, etc.

Figure 7:
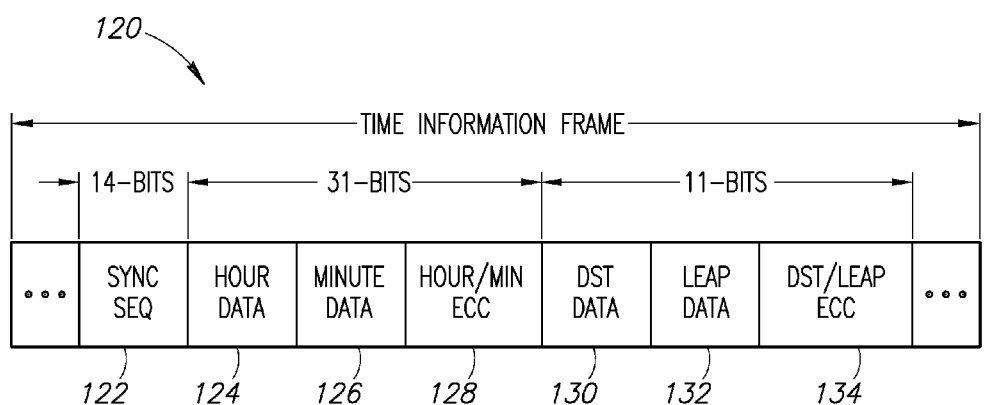
FIG. 7 is a diagram illustrating a second example time information frame structure incorporating timing, time and additional information.

A diagram illustrating a second example time information frame structure incorporating timing, time and additional information is shown in FIG. 7. The time information frame, generally referenced 120, comprises a synchronization sequence field 122, an hour data field 124, minute data field 126, optional hour/minute ECC field 128, daylight savings time (DST) data field 130, leap second data field 132 and DST/leap second ECC field 134. In one example, the synchronization sequence field 122 spans 14-bits; the combined hour data field 124, minute data field 126 and hour/minute ECC field 128 span 31-bits in a merged time data field; and the DST data field 130, leap second field 132 and DST/leap second ECC field 134 comprising an additional information field, spans 11-bits in total.

Figure 8:
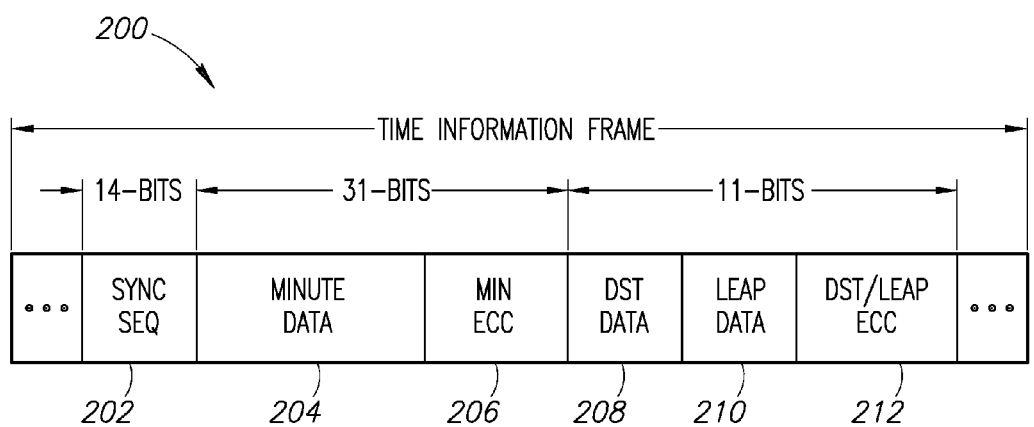
FIG. 8 is a diagram illustrating a third example time information frame structure incorporating timing, time and additional information.

A diagram illustrating a third example time information frame structure incorporating timing, time and additional information is shown in FIG. 8. The time information frame, generally referenced 200, comprises a synchronization sequence field 202, a minute data field 204, optional minute ECC field 206, daylight savings time (DST) data field 208, leap second data field 210 and DST/leap second ECC field 212. In one example, the synchronization sequence field 202 spans 14-bits; the minute data field 204 and minute ECC field 206 span 31-bits in a merged time data field; and the DST data field 208, leap second field 210 and DST/leap second ECC field 212 comprising an additional information field, spans 11-bits in total.

In the above two versions of the time information frame, the synchronization sequence comprises a 14-bit known sequence. The receivers use this sequence to acquire initial synchronization such as when first powering on. Receivers also use the sequence to track the synchronization timing signal broadcast in the frames in order to adjust their internal timekeeping to maintain synchronization with the transmitter.

Note that the term phase modulation may denote either (1) phase modulation over (i.e. combined with) the historical amplitude/pulse-width modulation or (2) pure phase modulation alone. Note also that the data fields assigned to each bit in the frame for both amplitude and phase modulation are essentially completely independent. In one embodiment, aspects of the historical amplitude/pulse-width modulation, however, are taken into consideration. For example, the assignment of data to the marker bits of the amplitude/pulse-width modulation is avoided due to the shorter high power duration (0.2 s) of these symbols.

Extracting timing from a digitally modulated received signal is best accomplished when a known sequence, having good autocorrelation properties, is embedded within it. This allows for a correlation operation in the receiver to reveal the timing of the received signal even in low SNIR conditions, for which the recovery of individual bits within the sequence might have involved high error probabilities. The successful identification of the known sequence does not require the recovery of the individual bits comprising it, and directly corresponds to the total energy in the known sequence, which is proportional to its duration. Therefore, the duration of the known sequence in the frame is maximized, while weighing this against the need to send the time information in a robust fashion, i.e. with redundancy. In one embodiment, a total duration of 14 seconds is allocated to the known synchronization sequence in the time information frame. Hence, the amount of energy invested in the timing information is on the order of a quarter of the total energy in a 60-second frame.

Figure 9:
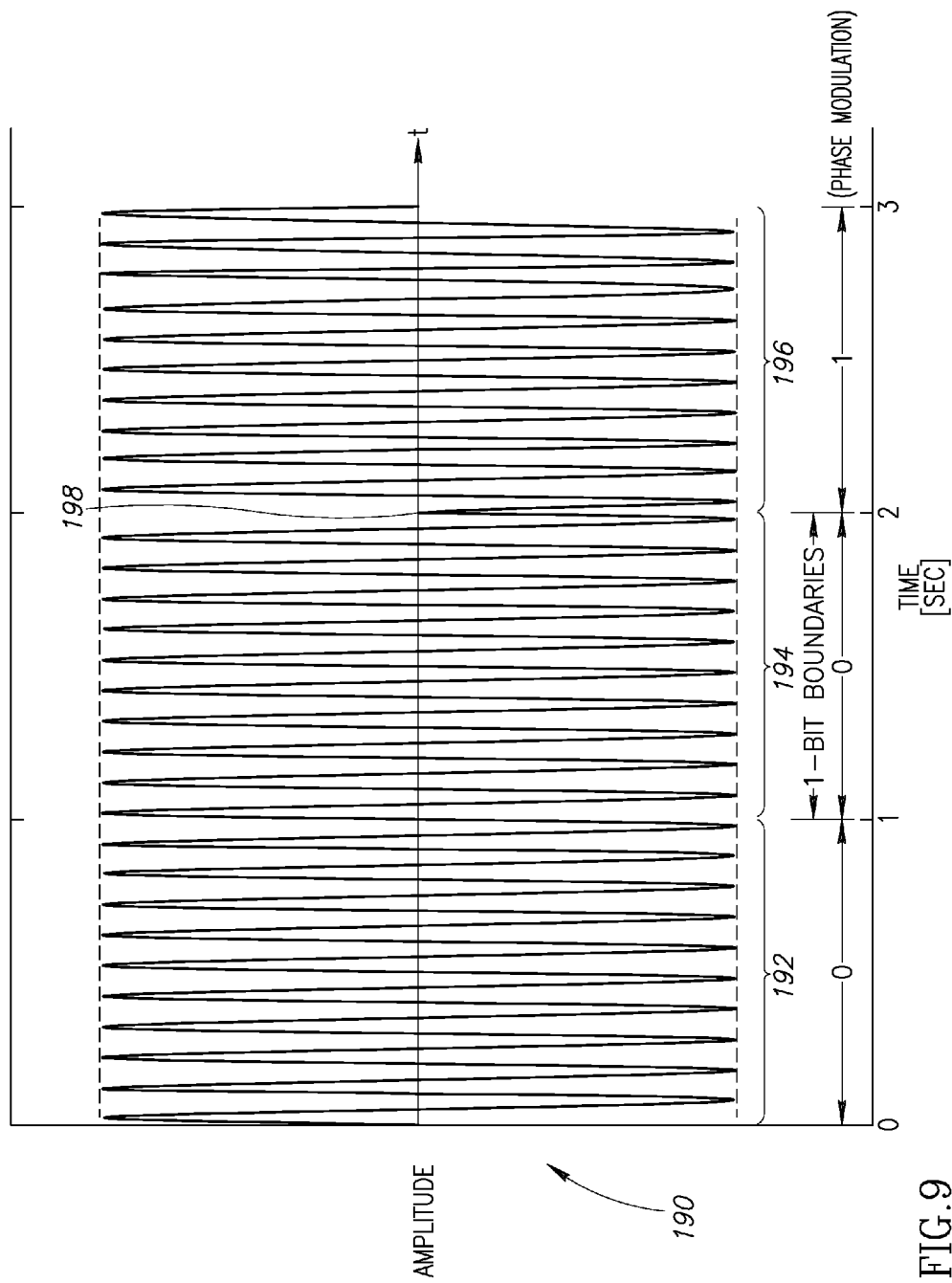
FIG. 9 is a diagram illustrating a second example waveform of phase modulation added to an amplitude/phase modulated carrier in an example communication protocol.

A diagram illustrating an example phase modulated carrier in an example communication protocol is shown in FIG. 9. In this second example waveform, the phase modulation is not added to a PWM/AM signal but rather is sent as the entire bit duration. The waveform illustrates three consecutive example bits in the transmission as a time-domain waveform 190. The three bits 192, 194 and 196 each span a duration of one second. During each of the bits the carrier power is high. The modulation of information is performed using BPSK (or PRK) modulation, in accordance with an embodiment of the present invention. A "1" is represented by a carrier having an inverted phase, with the phase inversion 198 occurring at the beginning of the bit, as shown for the third bit 196 at t=2 sec. The information sent in accordance with the BPSK protocol of the present invention is shown to be "0", "0", "1" (as shown along the bottom portion of the diagram). It is noted that the carrier frequency is not shown to scale in the figure to enhance clarity, but it is preferable (but not necessary) for the phase transitions to occur at zero crossing instances of the carrier, as may be implemented easily when a bit spans an integer number of carrier cycles, as is the case for WWVB, where the carrier frequency is 60 kHz (i.e. 60,000 cycles per bit).

A high level block diagram illustrating an example combined amplitude modulation (AM) and phase modulation (PM) receiver with multiple antennas is shown in FIG. 10. In this example embodiment, the receiver is operative to receive both a legacy PWM/AM modulated broadcast signal as well as a phase modulated signal which is transmitted over the legacy PWM/AM signal. The receiver, generally referenced 100, comprises an AM receiver block 104 and a PM receiver block 102, both of which are connected to antenna multiplexor 107 at their input and to processor 124 at their output.

A plurality of antennas 106 are coupled to antenna multiplexor 107 which functions to output a signal based on the signals generated by the plurality of antennas. The actual function or operation employed by the antenna multiplexor may be defined in accordance with the particular implementation and is not critical to operation of the invention. In one example embodiment, the antenna multiplexor combines the signals from its connected antennas using a defined function. The function may be defined a priori or may be defined dynamically based on one or more criteria. In another embodiment, the antenna multiplexor selects one of the input antenna signals where the selection is based on some criteria. The actual criteria used is not critical to the invention.

In the example embodiment shown in FIG. 10, an antenna multiplexor 107 is used to select one of the plurality of antennas 106 to feed to the AM and PM receivers 104, 102, respectively. A multiplexor control signal determines the particular antenna signal that is input to the AM and PM receivers. The multiplexor control signal may be generated by a processor 124 or other entity based on any desired criteria such as SNR or SNIR.

The amplitude modulation receiver 104 comprises an envelope-detector-based receiver of the type that is typically used in consumer market RCC devices. The AM receiver 104 comprises band pass filter (e.g., crystal filter) 110, envelope detector 112 and threshold block 114. As shown in this block diagram, the AM signal is converted into an analog equivalent baseband signal by use of a conventional nonlinear envelope detector 112 (similar to the diode-based circuit in traditional AM receivers). A threshold operation 114 that follows serves to determine the middle level, around which the voltages below it would be converted to a logic low level and the voltages above it to a logic high level. The digital processing stage that follows this operation measures the pulse durations and accordingly recovers the symbols ('1', '0', or 'marker'). Note that, with such a receiver topology, an on-frequency interferer can cause the receiver to decode that symbol incorrectly. Typically, the effect of the interferer is greatest when the signal is at a "low". If the interferer is exactly on-frequency, however, then it has a very significant effect when it is out of phase and added to the high state of the transmitted signal (e.g., the WWVB signal).

In operation of a typical envelope detector based receiver, the modulated signal input to the receiver has two different amplitude levels with the information represented in the durations of each of these levels. The high/low decision is made by following the "low" and "high" levels with dedicated peak holders (with appropriate time-constants) and deriving the middle (average) of these two. A threshold operation (e.g., a simple comparator) is then used to create the logic level signals for the digital stage that follows where the pulse durations are measured and the '1'/'0'/'marker' symbol decision is made.

The phase modulation receiver 102 comprises a demodulator 118, correlator 120 and decoder 122. In one embodiment, the PM receiver 102 is operative to receive the signal broadcast from WWVB in Fort Collins, Colo. This broadcast signal adds phase modulation (PM) to the WWVB broadcast while maintaining the existing AM code, so as not to impact the existing time-of-day RCC devices.

A high level block diagram illustrating an example phase-modulation only receiver with multiple antennas is shown in FIG. 11. In one embodiment, the receiver, generally referenced 220, comprises a coherent BPSK optimal receiver that may be implemented digitally. The PM receiver 220 comprises a plurality of antennas 234, antenna multiplexor 236 coupled to analog front end (AFE) 222, low pass filter (LPF) 224, analog to digital converter (ADC) 226, mixer 228, locally synthesized carrier (i.e. local oscillator (LO)) 238, correlator 230 and threshold detector 232. The filtering of the signal is based on the correlation operation which is followed by a decision that is made in the presence of AWGN.

A plurality of antennas 234 are coupled to antenna multiplexor 236 which functions to output a signal based on the signals generated by the plurality of antennas. The actual function or operation employed by the antenna multiplexor may be defined in accordance with the particular implementation and is not critical to operation of the invention. In one example embodiment, the antenna multiplexor combines the signals from its connected antennas using a defined function. The function may be defined a priori or may be defined dynamically based on one or more criteria. In another embodiment, the antenna multiplexor selects one of the input antenna signals where the selection is based on some criteria. The actual criteria used is not critical to the invention.

In the example embodiment shown in FIG. 11, an antenna multiplexor 236 is used to select one of the plurality of antennas 234 to feed to the PM receiver. A multiplexor control signal determines the particular antenna signal that is input to the PM receiver. The multiplexor control signal may be generated by a processor (not shown) or other entity based on any desired criteria such as SNR or SNIR.

Note that the term phase modulation may denote either (1) phase modulation over (i.e. combined with) the legacy amplitude/pulse-width modulation or (2) pure phase modulation alone. Note also that data fields assigned to each bit in the frame for both amplitude and phase modulation are essentially completely independent.

The phase modulation added to the amplitude modulation may comprise any suitable type of phase modulation including, for example, BPSK, DBPSK, PRK, angle modulation, PM, MSK, FSK, etc. In addition, the underlying amplitude modulation may comprise any type of amplitude modulation, including for example, ASK, AM, SSB, QAM, pulse position modulation (PPM), pulse width modulation (PWM), OOK, ASK, etc.

As described supra, the RCC broadcast signal may employ phase modulation, in addition to, or in place of traditional AM modulation. The addition of phase modulation enables increased sensitivity and improved performance at low SNIR (signal-to-noise-and-interference-ratio) compared to AM modulation. The use of a receiver employing multiple antennas allows the avoidance of orientation-dependent nulls in reception, which could degrade receiver performance regardless of the type of modulation used. Thus, the multiple antenna scheme of the present invention is applicable to any RCC type receiver whether employing AM, FM, PM, PWM or any combination thereof.

The invention thus provides a solution for the directionality problem that is suitable for products of various form factors. In accordance with the present invention, a plurality of antennas are used in the receiver. In one embodiment, the multiple antennas are placed substantially perpendicular to each other. In the case of a dual antenna, for example, if the device relying upon the multiple antenna structure is placed at the worst orientation for the first antenna, for which it experiences a null, the second antenna is at its optimal orientation and offers better reception. Note that the receiver may have the capability to determine which of the two antennas offers superior reception, or may simply toggle to the second antenna if reception fails in the first antenna, which may have been chosen arbitrarily. In such operation, particularly when reception in the first antenna is successful, thereby obviating the need to attempt reception in the second antenna, the receiver may never establish which antenna experiences superior reception. Furthermore, it is conceivable that the second antenna would never be used, if reception through the first one is repeatedly successful.

Note that in the case of a multi-antenna RCC used in conjunction with a phase-modulated signal, both the multi-antenna capability, as well as the enhanced modulation scheme, serve to improve the overall robustness of the system, particularly in the presence of interference. In particular, when a strong interfering signal is induced from a particular direction that is more closely aligned with one antenna than with the other(s), it may be possible to mitigate its effect by avoiding that antenna, even if the level of the desired signal is higher in it. This implies that the selected antenna may have the highest SNIR ratio rather than the strongest level of desired signal, representing one embodiment of the present invention, in terms of the antenna selection criteria.

As is well known, low frequency (LF) electromagnetic waves can propagate very long distances (e.g., thousands of kilometers) due to the good reflective properties of the ionosphere at those frequencies. In essence, a waveguide is formed between the earth and the ionosphere where LF waves propagate with relatively little path loss. Moreover, due to the long wavelengths, LF waves can easily propagate into and around urban structures without diffraction losses. These are the primary reasons for using the LF band for timekeeping signal broadcasts. Transmission and reception of electromagnetic waves in the low frequency (LF) band, however, are extremely challenging due to the very long wavelengths involved (e.g., five kilometers in the case of WWVB, operating at 60 kHz). Consequently, in the transmitting antenna, having relatively small dimensions compared to the wavelength, most of the power is lost to poor antenna efficiency due to physical size restrictions.

The situation is a few orders of magnitude worse for the receiving antennas placed in relatively small consumer-market products. In particular, antennas integrated into wristwatches to receive the time signals at a frequency of 60 kHz are typically about 2 cm long, i.e. about 1/250000 in wavelength. Typical ferrite-core inductors commercially available for receivers in watches have a ferrite core with a relative permittivity of approximately $\mu_r \sim 2000$ and length of approximately 20 mm. Considering the complete receiver system, this antenna constitutes the bulkiest and potentially most expensive component in the system. This bulky component cannot be easily miniaturized and its cost is prohibitively high compared to the rest of the receiver. It should be noted that in single antenna systems, further losses may be experienced as a result of mis-orientation, as the magnetic pickup of a ferrite-rod antenna requires that it be placed broadside towards the broadcasting station, allowing the magnetic flux to flow through the loops constituting the antenna. By addressing this problem, the present invention allows for each of the multiple antennas in the system to be smaller and cheaper, thus offering a significant advantage.

Several embodiments of a multiple antenna receiver scheme are presented infra as well as a method for the selection of the preferred antenna. Several examples of inductors with reduced size and cost are presented for use in RCC receivers.

In an example embodiment, two ferrite-rod antennas are used, which are placed perpendicularly on a printed circuit board (PCB) or in the housing of a device, such as an alarm clock that is placed on a night table. The orientation of the PCB in such a device is parallel to the floor. In this embodiment, both ferrite rods are parallel to the floor, and if one happens to experience a null, the other antenna offers better reception. In addition, the two antennas may also differ in the level of interference they pick up from a nearby source of EMI, allowing the receiver to select the antenna for which the higher signal-to-interference ratio is experienced rather than selecting an antenna based on the highest level of signal sensed for each antenna.

Figure 12:
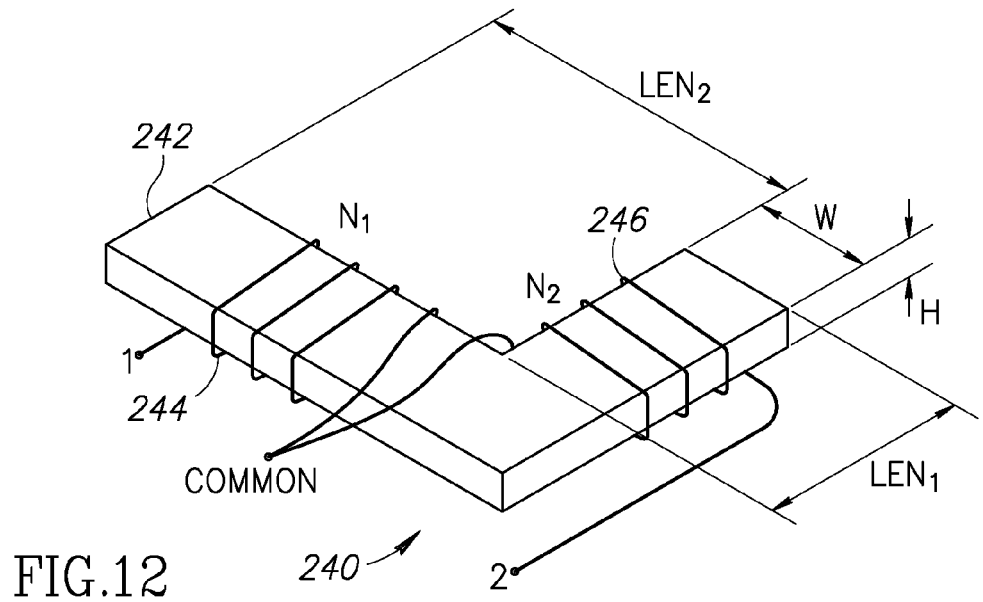
FIG. 12 is a diagram illustrating an example 'L' shaped dual antenna.

A diagram illustrating an example 'L' shaped dual antenna is shown in FIG. 12. The 'L' shaped antenna, generally referenced 240, comprises an 'L' shaped ferrite rod or bar 242 with each leg having separate windings. A first leg having length $L_1$ has a winding 244 of $N_1$ turns. A second leg having length $L_2$ has a winding 246 of $N_2$ turns. Both legs have a height H and width W. The windings are connected at a common point, which is connected to the receiver alongside with leads 1 and 2, thus representing a 3-terminal interface. Note that $L_1$ and $L_2$ may be equal or non-equal depending on the particular implementation.

Note that in the ferrite-core based embodiment, the two substantially orthogonal antennas are based on windings on the two orthogonal arms of the L-shaped core. The two inductors can either share a terminal (i.e. three terminal interface), as shown in FIG. 12, or may be connected separately to the receiver (i.e. a four wire interface).

In alternative embodiments, the ferrite core may have other shapes, such as a T-shaped core, X-shaped core or other shape to provide two separate inductors wound on the same ferrite core such that the two antennas do not have a common axis, thereby having different null orientations. In the case that the two antennas share a common terminal (i.e. a three wire interface), the interface between the dual-antenna structure and the receiver is simplified in terms of pin count. It may allow the switching between the antennas within the receiver to use fewer switching elements.

Figure 13:
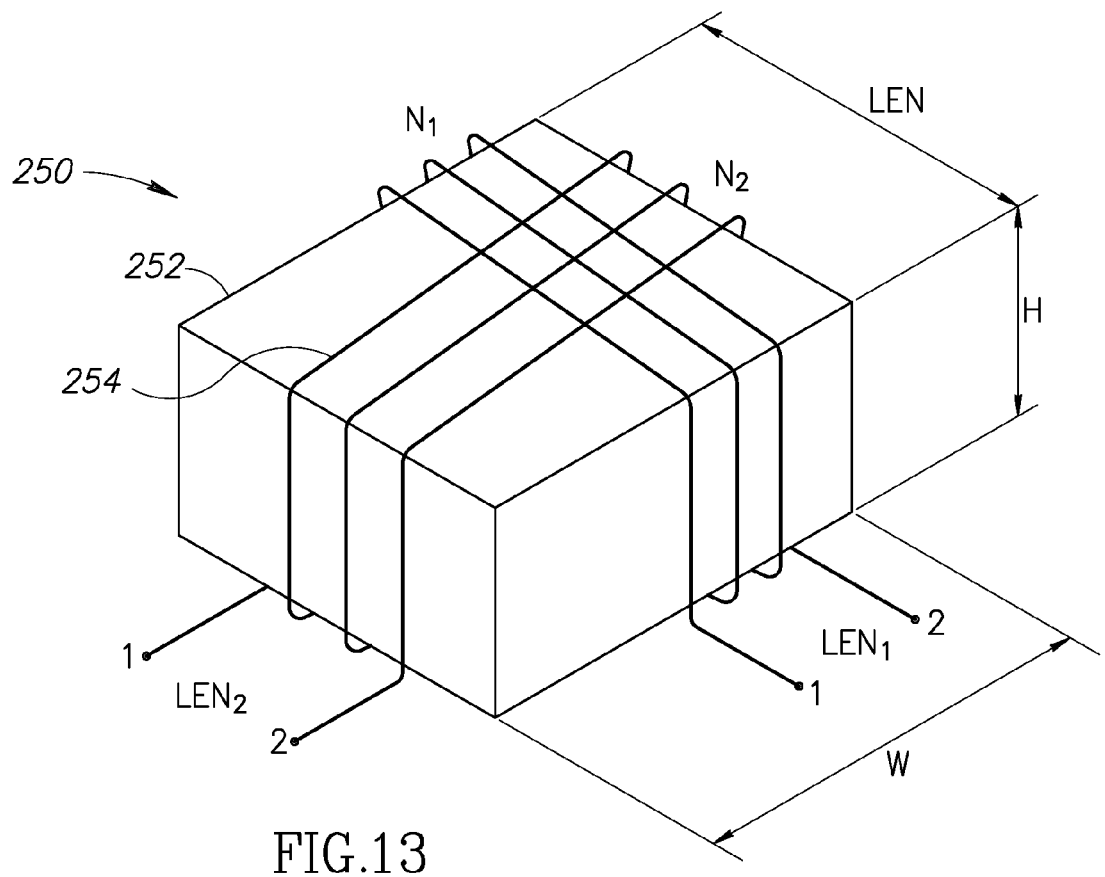
FIG. 13 is a diagram illustrating an example dual antenna with shared ferrite block.

A diagram illustrating an example dual antenna with shared ferrite core block is shown in FIG. 13. In this ferrite-core based embodiment, the antenna, generally referenced 250, comprises a core 252 which may be a rectangular, cubic, hexahedron or other shaped prism with the two inductor windings 254 having $N_2$ windings, and 256 having $N_1$ windings, wound around different dimensions of it. The width W, length LEN and height H may be either equal or unequal, potentially leading to a situation where $L_1 \neq L_2$. Depending on the implementation, if there is an advantage in satisfying $L_1=L_2$, the inequality in the dimensions may be compensated through a corresponding $N_2/N_1$ turns ratio. For example, when the ferrite core has a cube shape (i.e. W=H=LEN), the inductances may be made equal when $N_1=N_2$. Another degree of freedom is the location of the windings with respect to the edges of the faces of the ferrite shape onto which the wire is wound. In the example shown in FIG. 13, the $N_1$ windings are placed to the right of center, whereas the $N_2$ windings are substantially centered.

Figure 14:
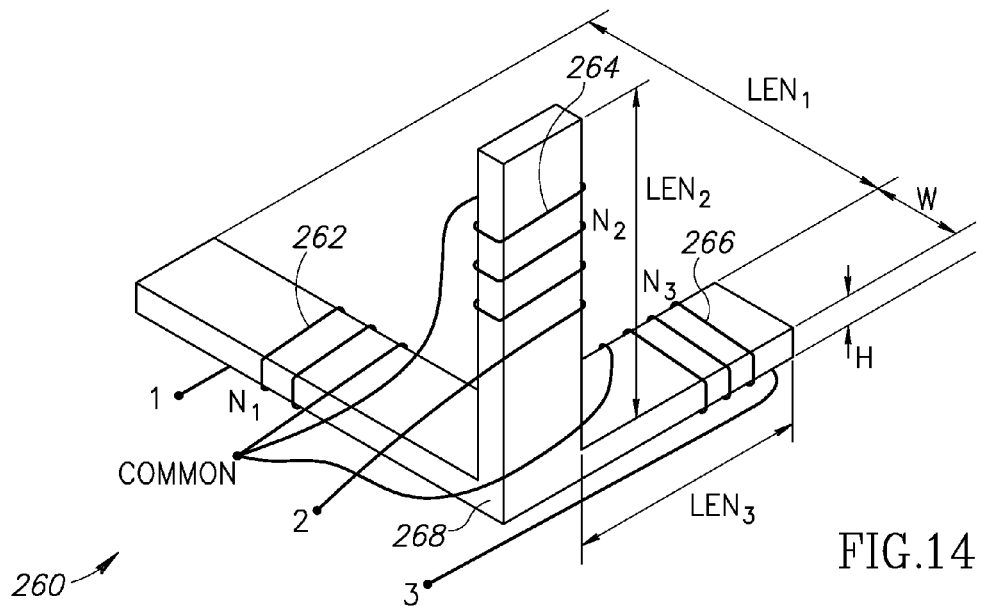
FIG. 14 is a diagram illustrating an example 3-dimensional triple antenna.

A diagram illustrating an example 3-dimensional triple antenna is shown in FIG. 14. The three-dimensional 'L' shaped antenna, generally referenced 260, comprises a ferrite core 268 having three legs substantially orthogonal to each other. A first leg of length $LEN_1$ comprises winding 262 with $N_1$ turns; a second leg of length $LEN_2$ comprises winding 264 with N2 turns; and a third leg of length $LEN_3$ comprises winding 266 with N3 turns. The legs have a width W and height H. The windings are connected at a COMMON point with leads 1, 2 and 3 connecting to the receiver. Note that $LEN_1$, $LEN_2$ and $LEN_3$ may be equal or non-equal depending on the particular implementation, and the resultant inductance $L_1$, $L_2$ and $L_3$ may be either equal or unequal.

Note that the three inductors can either share a terminal (i.e. four terminal interface), as shown in FIG. 14, or may be connected separately to the receiver (i.e. a six wire interface). In alternative embodiments, the ferrite core may have other shapes, such as a three-dimensional T-shaped core, X-shaped core or other shape such that the three antennas do not have a common axis, thereby having different null orientations, may be used to provide three separate inductors wound on the same ferrite core.

Figure 15:
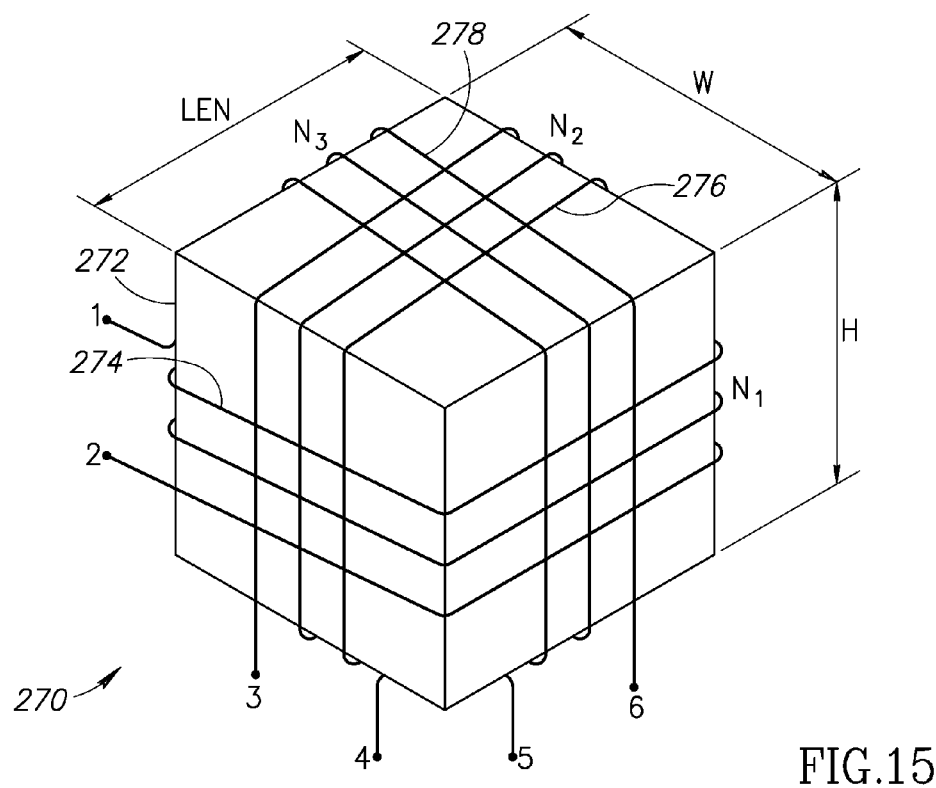
FIG. 15 is a diagram illustrating an example triple antenna with shared ferrite block.

A diagram illustrating an example triple antenna with shared ferrite block is shown in FIG. 15. In this ferrite-core based embodiment, the antenna, generally referenced 270, comprises a core 272 which may be any type of hexahedron, rectangular, cubic or other shaped prism with the three inductor windings 274, 276 and 278 wound around different dimensions thereof and having turns ratio $N_1$, $N_2$ and $N_3$, respectively. The width W, length LEN and height H may be either equal or unequal, potentially leading to a situation where $L_1=L_2=L_3$. Note that variations in the dimensions may be compensated through corresponding relationships between the turns ratio of $N_1$, $N_2$ and $N_3$. When the ferrite core has a cube shape (i.e. W=H=LEN), the three inductances can be made equal when $N_1=N_2=N_3$. Another degree of freedom is the location of the windings with respect to the edges of the faces of the ferrite shape onto which the wire is wound.

In one embodiment, one or more of the individual antennas may comprise an antenna printed on FR-4 material, or other PCB material. Such an antenna can be placed alongside receiver circuitry and serve as a second antenna (in addition to a ferrite-rod antenna, which may be considered the main/primary antenna, for example). Inductor structures for PCBs are known in the art. The inductor could be designed to occupy an area smaller than 10 cm². A larger antenna can be used, where possible, to allow for better pick-up, at the cost of greater area. A capacitor is typically placed in parallel with the inductor, to resonate at the frequency of interest (e.g., 60 kHz for reception of the WWVB broadcast).

Figure 16:
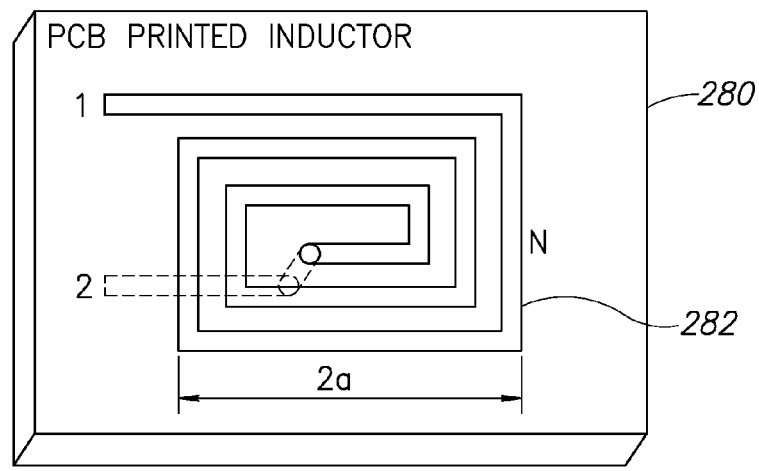
FIG. 16 is a diagram illustrating a first example printed circuit board based printed inductor.

A diagram illustrating a first example printed circuit board based printed planar spiral inductor is shown in FIG. 16. The printed inductor comprises a planar square spiral shaped conductive trace 282 printed or etched onto a PCB material 280 such as FR-4. Note that dashed lines indicate a conductive trace on the opposite side of the PCB.

In an alternative embodiment, the planar square spiral inductor can be monolithically integrated with the RCC receiver circuit described supra. In this case, the spiral inductor is constructed on a semiconductor substrate and may be sandwiched between the substrate and a high-permittivity ferrite superstrate where the length 2a of one side of the spiral is on the order of a few millimeters. For example, the planar inductor may comprise a square spiral consisting of 30 turns, each of which has a thickness of 35 μm and trace width of 50 μm. Considering a gap of 10 μm between the traces, the resulting inductance L can be calculated as $$L = \mu_0 \mu_r N^2 a \quad (2)$$

where $2a$ is the side length of the spiral inductor.

In one embodiment, the ferrite superstrate comprises CoZrTa magnetic material. The copper wires making up the inductor are formed on top of CMOS circuitry and surrounded by CoZrTa magnetic material deposited around the wires using magnetic vias to complete the magnetic circuit.

Assuming an effective $\mu_r \sim 500$ for the ferrite superstrate results in 1 mH self-inductance, which is comparable to a ferrite core inductor. Furthermore, the total resistance of the spiral is $2\Omega$, resulting in a minimum Q of approximately 177 at 60 kHz. These values are close to commercially available ferrite-core antennas with the difference being that the spiral antenna of the present invention has the benefits of (1) low-cost, (2) planar design, and (3) monolithically integrated with the rest of the receiver. Thus, the cost of the receiver can be cut by more than half and the weight and volume of the system can be significantly reduced without any performance degradation.

Figure 17:
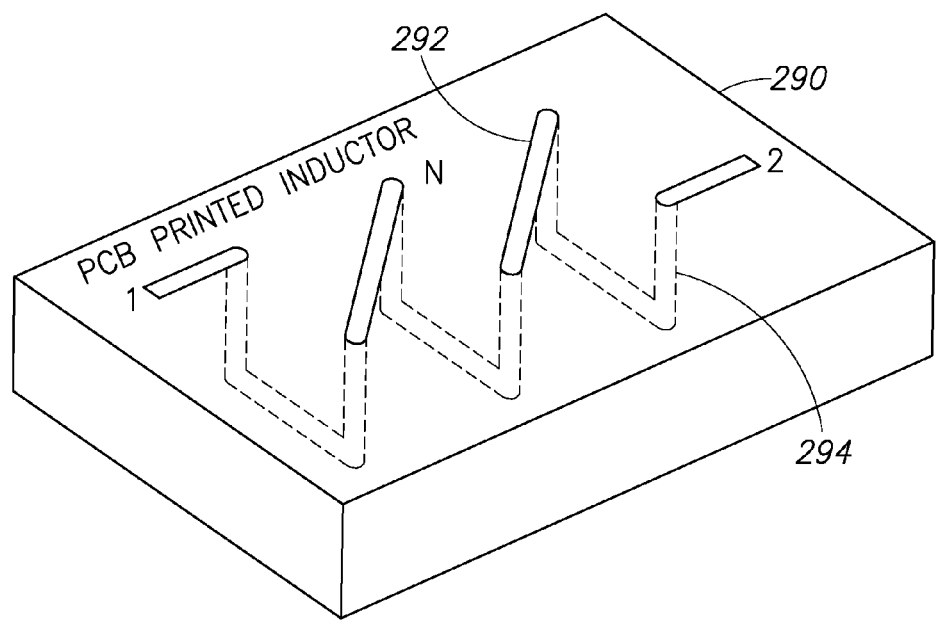
FIG. 17 is a diagram illustrating a second example printed circuit board based printed inductor.

A diagram illustrating a second example printed circuit board based printed inductor is shown in FIG. 17. The printed inductor comprises conductive traces 292 on both sides of the PCB material 290 connected by a plurality of conductive vias 294. The combination of printed traces and vias take the shape of turns or coils that pass through the PCB.

The above described structures are applicable to numerous devices such as wall-clocks where the PCB is perpendicular to the floor. In such a position, the ferrite rod antenna, which is typically placed along the wide dimension of the clock's face, is parallel to the floor, and when its orientation is at a null, an orthogonal antenna, that would be at an optimal orientation, would have to be positioned vertically (i.e. protrude from the flat clock), which is usually impractical. The printed antenna offers a solution to that orientation, while being flat.

This second antenna may have inferior performance with respect to the ferrite rod, but may still offer a benefit whenever the primary antenna exhibits poor reception due to orientation or a strong interferer. For example, if the primary antenna suffers a loss of 15 dB due to misalignment with the optimal direction, and the printed antenna is only 10 dB inferior to it (when they are compared at their strongest orientations), then by switching to the printed (i.e. secondary) antenna, the receiver will gain 5 dB in signal strength. The second antenna may also serve to offer relief from a strong interferer, since the interferer may be much stronger in one orientation versus the other, whereas the signal level may be sufficiently high in the antenna for which the interference is lower.

In another embodiment, where the width of the printed antenna is narrow enough, or the product is not too flat, both antennas may be printed, with one being based on a separate dedicated PCB, which is mounted perpendicularly onto the main PCB. The printed antenna may also be coated with a ferromagnetic material, or a ferromagnetic material may be placed in contact or close proximity, to increase the inductance of the printed antenna.

In an alternative embodiment, a wire is wound around the PCB (e.g., around the face of a wall clock) and acts as an inductor whose optimal orientation is orthogonal with the ferrite rod assumed to be parallel to the floor. Note that the inductance achievable in such wire based antenna typically depends on the area captured by it and the number of windings in the inductor.

Figure 18:
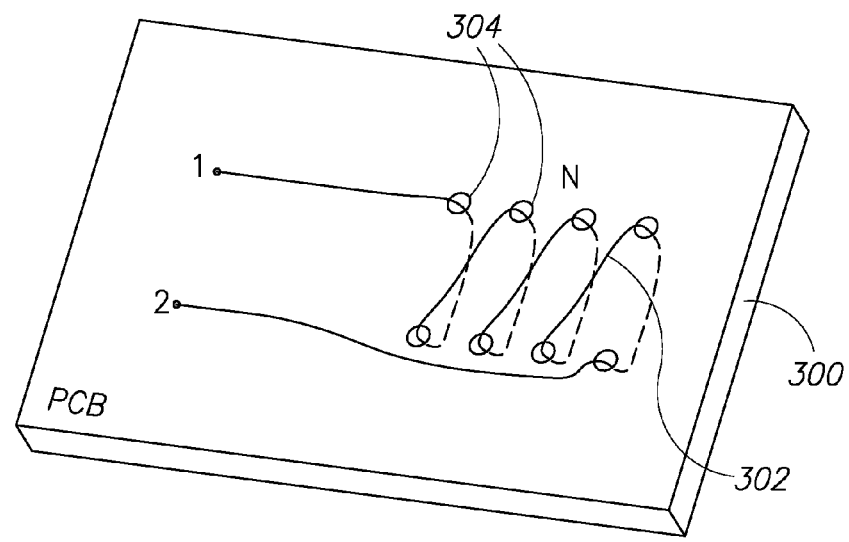
FIG. 18 is a diagram illustrating a first example printed circuit board based antenna.

A diagram illustrating a first example printed circuit board based antenna is shown in FIG. 18. The PCB antenna comprises a wire 302 wound through PCB material 300 forming N turns or coils making up the inductor. The wire passes from one side of the PCB to the other through holes 304.

Figure 19:
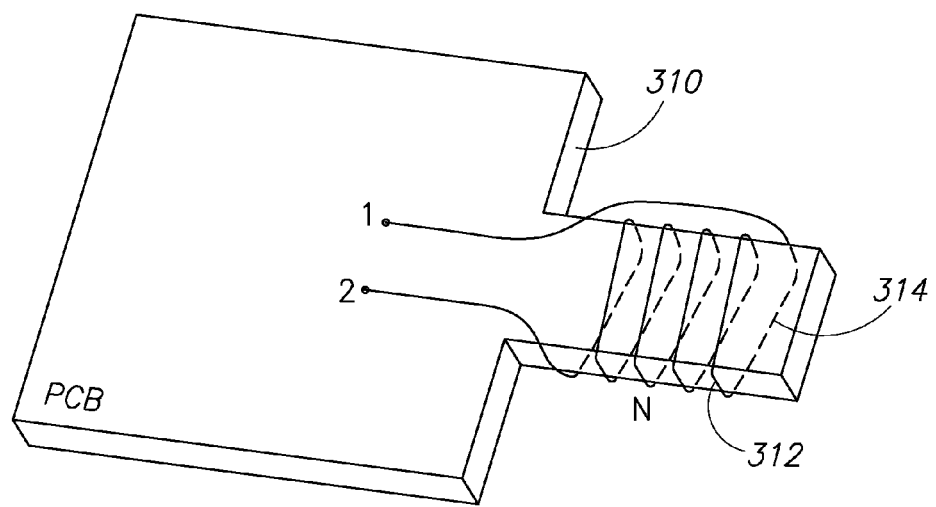
FIG. 19 is a diagram illustrating a second example printed circuit board based antenna.

A diagram illustrating a second example printed circuit board based antenna is shown in FIG. 19. The PCB antenna comprises a wire 312 wound around a narrow portion of PCB material 314 that is attached or separate from the main board 310. A number of turns N of the wire form the inductor.

Note that the PCBs of antennas of both FIGS. 18 and 19 may be coated with a ferromagnetic material, or a ferromagnetic material may be placed in contact or close proximity, to increase the inductance of the antenna.

Note that in another embodiment, one or more of the antennas of a multi-antenna receiver may comprise surface mount devices (SMD) of relatively small dimensions. A single antenna of such a type may be used in small wrist watches, where it is assumed to experience various different orientations since a wrist watch is typically not stationary, such that it will eventually receive. Alternatively, windings in two or three orthogonal directions, as shown in FIGS. 13 and 15, respectively, may allow for reception even when one antenna is at a null, without doubling or tripling the mass of the ferromagnetic material in the device.

In certain embodiments, a plurality of antennas may be used to avoid potential nulls, comprising a combination of ferrite-core antennas, PCB printed antennas and antennas integral to the case or structure of the clock, watch, or other timekeeping device.

In a ferrite core embodiment, a plurality of antennas may be wound on the same piece of ferrite material. This piece of ferrite may have one of the shapes described supra, or have an arbitrary shape depending on the implementation. Provided that the axis of at least two antennas is not common, then, for any orientation, a null can be avoided with an appropriate selection of antenna(s) for a particular orientation, or a linear combination of signals from the antennas, for a given orientation.

As described supra, the receiver may generate a linear combination of the multiple antenna signals or select one of them for input to the receiver. In one embodiment, the receiver comprises the capability to measure and/or estimate the signal-to-noise-and-interference (SNIR) conditions and determine which of the plurality of antennas offers superior reception. The algorithm used may be based on any desired criteria, such as toggling to an alternate antenna if initial reception on a currently selected antenna appears marginal. Note that if the reception SNIR is higher than a certain threshold (e.g., 20 dB above reception threshold) then reception may be based on the antenna that was selected first and there is thus no need to compare reception with an alternate antenna.

In the case where the antennas are in a device whose location is substantially static (e.g., a wall clock that is not assumed to be moved around), then a comparison between the two antennas can be assumed to remain valid longer, i.e. indefinitely. In contrast, in a moving car, for example, there may be a need (and available energy resources) to perform reception in both antennas more frequently.

Alternatively, the receiver may be configured to toggle between the antennas at a periodic or random interval, to obviate the need for a determination of which antenna provides the stronger SNIR, and/or to compensate for the possibility that the SNIR may change or drift over time, depending on orientation and/or sources of interference.

The receiver may also be designed to employ a linear combination of the signals from the plurality of antennas, with the linear coefficients selected for higher SNIR, or adjusted at periodic or random intervals to assure that one or more combinations avoids a null and experiences acceptable SNIR.

Several example antennas suitable for use with the present invention are presented hereinbelow including a description of physical dimensions, radiation efficiency, avoidance of directionality/nulls and suitable mathematical models.

In electrically small antennas, where the physical dimensions are significantly smaller than the wavelength, as with the reception of the WWVB signal, loop antennas are often used. Due to being very small electrically, loop antennas have inherently low radiation resistance (and hence low efficiency). To alleviate this, in one embodiment, multiple loops are connected in series to form a coil. Ferrite cores can be inserted within coil antennas to further augment the radiation resistance (i.e. load). In one embodiment, the ferrite loading in the antenna is eliminated thereby allowing for a reduction in the antenna's form factor which simplifies its integration with various products as well provides a substantial cost savings.

The pattern of a small loop antenna is directional with a null occurring along the axis perpendicular to the loop. Furthermore, loop antennas are linearly polarized and thus must be polarization matched for reception. To mitigate this orientation (i.e. directional) sensitivity, two orthogonal loops or coils are employed, as previously demonstrated and as illustrated in the example shown in FIG. 20. The orthogonal antennas 322, 324 can be switched or their responses can be combined.

Figures 21A, 21B, 21C:
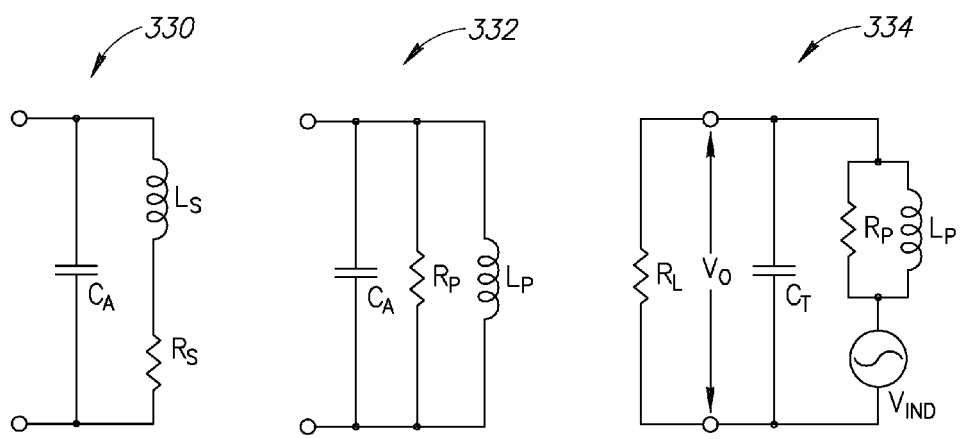
FIG. 21A is a diagram illustrating a series equivalent model of a coil antenna.
FIG. 21B is a diagram illustrating a parallel equivalent model of a coil antenna.
FIG. 21C is a diagram illustrating a loaded parallel equivalent model of a coil antenna.

A diagram illustrating a series equivalent model of a coil antenna is shown in FIG. 21A. In the series model of the equivalent circuit representing a coil antenna, the series inductance for a cylindrical coil $L_s$ and resistance $R_s$ are given by:

$$L_s \approx \frac{\mu_{rod} F_L \mu_0 N^2 A}{l_c} \quad (3)$$

$$R_s \approx R_{rod} + R_{loss} \quad (4)$$

where
$\mu_{rod}$ is the effective permeability, which varies with $\mu_r$ and rod geometry; for an unloaded coil, $\mu_{rod}=1$
$F_L$ is the geometry dependent empirical factor;
N is the number of turns;
A is the area of the coil;
$l_c$ is the length of the coil;
The radiation resistance is given by $$R_{rad} = \frac{\eta \left(\frac{2\pi}{\lambda}\right)^4}{6\pi} (\mu_{rod} F_V NA)^2 \quad (5)$$

The antenna capacitance $C_a$ is small and is often determined empirically. The equivalent circuit is typically represented in the parallel model shown in FIG. 21A. A diagram illustrating a parallel equivalent model of a coil antenna is shown in FIG. 21B. A diagram illustrating a loaded parallel equivalent model of a coil antenna is shown in FIG. 21C.

Referring to FIG. 21A, since $R_s$ is very small (making $R_p$ very large):

$$L_p \approx L_s \quad (6)$$

The parallel equivalent circuit representing the antenna connected to a receiver (represented by load $R_L$) is given in FIG. 21C. The parallel capacitance $C_T$ represents the stray capacitance in the coil, as well as the parallel connected matching/resonating capacitance. The equivalent source produces a voltage given by:

$$V_{ind} = \oint_C \bar{E} \cdot d\bar{l} \quad (7)$$

If the antenna is aligned such that the incident magnetic field is perpendicular to the loop, the induced voltage reduces to:

$$V_{ind} = 2\pi \mu_{rod} f N A \frac{E^{inc}}{v_p} \quad (8)$$

Where $v_p$ is the speed of light. For the circuit model shown in FIG. 21C, the relationship between $V_{ind}$ and $V_0$, which is the actual voltage across the load (i.e. receiver), is given by:

$$\frac{V_0}{V_{ind}} = G(s) = \frac{\frac{1}{1/R_L + C_T s}}{\frac{1}{1/R_L + C_T s} + \frac{1}{1/R_P + Ls}} \quad (9)$$

Which represents a voltage gain. By defining the following quantities:

$$\omega_0^2 = \frac{1}{LC_T} \quad (10)$$

$$Q_{unl} = \omega_0 R_P C_T \quad (11)$$

$$Q_L \equiv Q_{loaded} = \omega_0 \frac{R_P R_L}{R_P + R_L} C_T \quad (12)$$

Equation 9 can be rewritten as:

$$G(s) = \frac{\omega_0}{Q_{unl}} \frac{s + Q_{unl}\omega_0}{s^2 + \frac{\omega_0}{Q_L}s + \omega_0^2} \quad (13)$$

Considering the circuit at resonance ($\omega=\omega_0$) and assuming $Q_{unl} \gg 1$, we obtain:

$$G(j\omega_0) = \left(1 + j\frac{1}{Q_{unl}}\right)(-jQ_L) \quad (14)$$

$$|G(j\omega_0)| \approx Q_L \quad (15)$$

Thus, a higher loaded quality factor results in a greater input voltage for a given field intensity. Therefore, a high input impedance, denoted $R_L$ in the equivalent circuit and Equations 9 and 12, is used for the receiver such that the inevitably finite resistance $R_P$ dominates.

Figure 20:
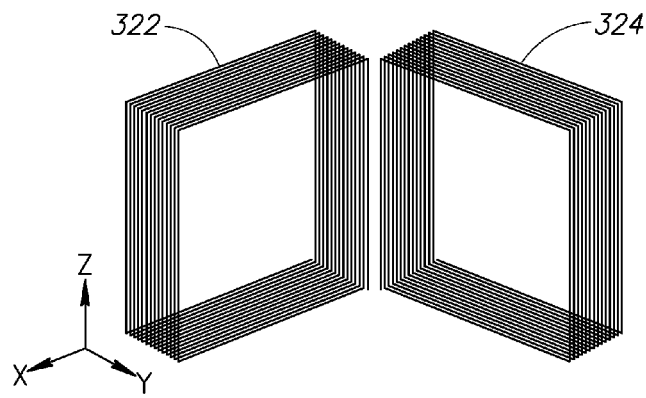
FIG. 20 is a diagram illustrating an example dual antenna.
Figure 22:
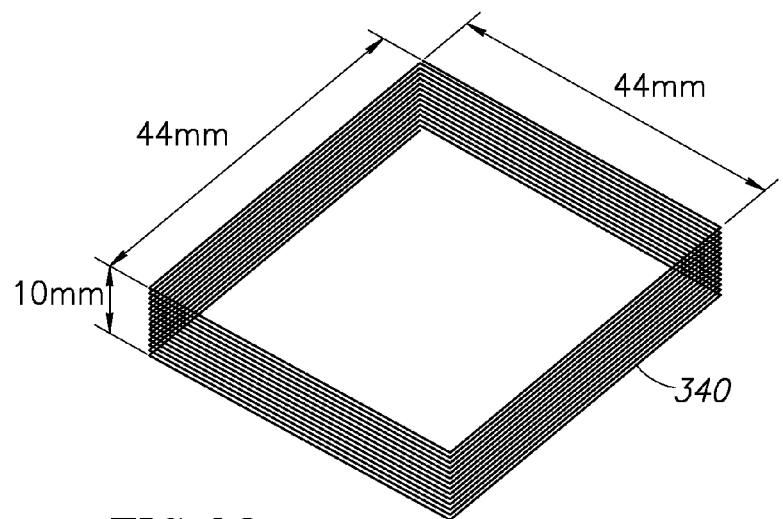
FIG. 22 is a diagram illustrating an example unloaded antenna.

A diagram illustrating an example unloaded coil antenna is shown in FIG. 22. The antenna comprises a flat coil 340 having square dimensions 44 mm length by 10 mm height. To reduce the nulls that would otherwise be present in the loop pattern, particularly for fixed devices, the flat coil form factor can facilitate a two-coil antenna system, as shown in FIG. 20. The coil shown in the example in FIG. 22 is quadruple wrapped (i.e. four layers) to augment the inductance. A coil having 100 turns, using a wire pitch of 0.4 mm results in an $$\frac{e_{ref}}{e_{prop}} \approx 15$$

and inductance L of 1.0 mH. Alternatively, the coil may be singly or doubly wrapped. Two or more coils may be used to reduce or eliminate reception nulls in fixed receivers when oriented orthogonally to each other, as shown in the example antenna comprising two coils as shown in FIG. 20.

Figure 23:
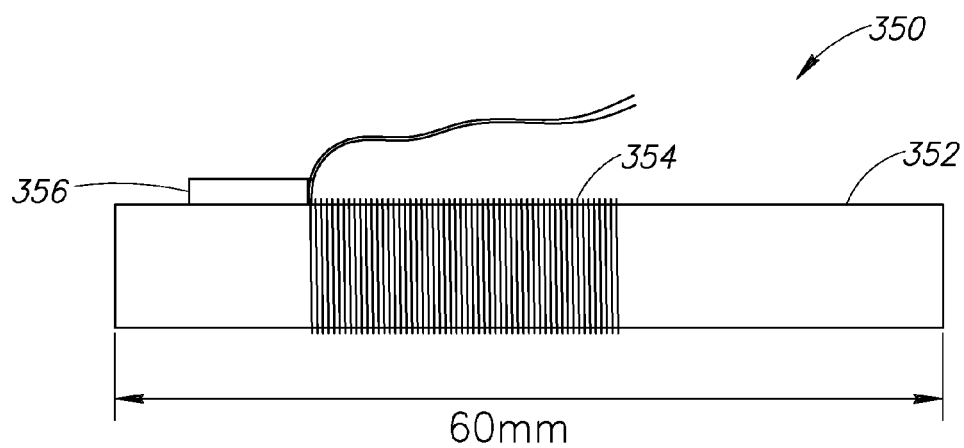
FIG. 23 is a diagram illustrating an example ferrite rod antenna.

A diagram illustrating an example ferrite rod antenna suitable for WWVB receivers is shown in FIG. 23. The antenna, generally referenced 350, comprises a ferrite core 352, one or more windings 354 and optional one or more embedded tuning capacitor(s) 356. An inductance L of approximately 1.5 mH is achieved with about 150 turns and length of about 2 cm. Two such antennas oriented substantially perpendicularly can serve as the antenna system in accordance with the present invention, particularly in devices that have a flat form factor parallel to the floor, such as an alarm clock that is placed on a night table, as opposed to a flat wall-clock that is hung on the wall. It is noted that one or more embedded tuning capacitors (i.e. to yield a loaded antenna coil) may be added to any of the antenna embodiments disclosed herein to improve performance and eliminate the requirement of additional components on the printed circuit board.

Figure 24:
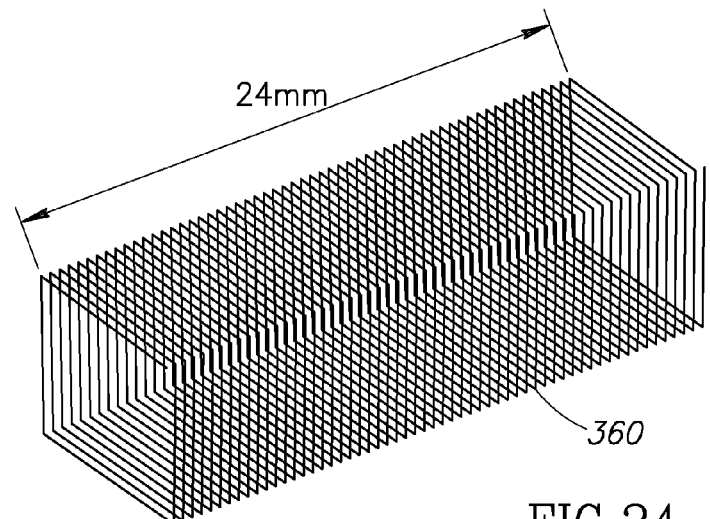
FIG. 24 is a diagram illustrating an example unloaded coil antenna.

In another embodiment, an unloaded coil antenna for mobile devices is shown in FIG. 24. The coil 360 has a small form factor well suited to mobile devices where compactness is of major importance. The antenna is double wrapped, having the dimensions of 24 mm length, 8 mm height and width, has about 240 turns, a wire pitch of 0.2 mm, $$\frac{e_{ref}}{e_{prop}} \approx 86$$

and an inductance L of approximately 1.8 mH.

Figure 25:
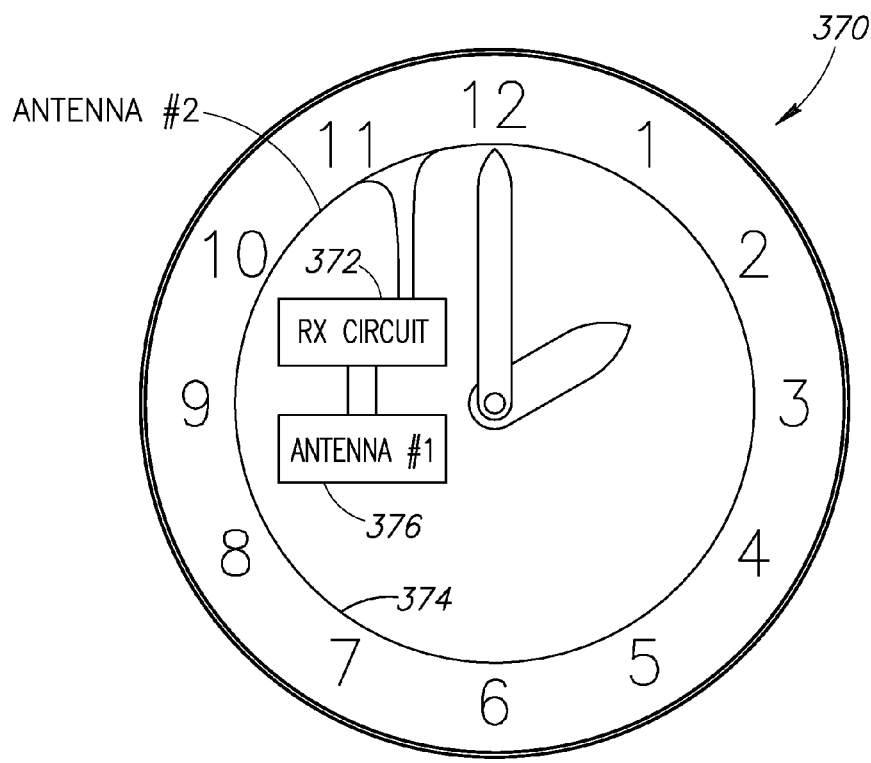
FIG. 25 is a diagram illustrating an example wall clock with integrated primary antenna and optional second antenna.

A diagram illustrating an example wall clock with integrated primary antenna and optional second antenna is shown in FIG. 25. In this embodiment, a wall clock, generally referenced 370, comprises RX circuit 372 and primary antenna #1 376 as well as an optional secondary antenna #2 374. The primary antenna may comprise any suitable antenna such as a loaded or unloaded coil antenna, ferrite rod antenna, any of the antennas disclosed and described supra, etc. The secondary antenna #2 may, for example, comprise a coil of wire wound around the face of the clock. In one embodiment, the coil is positioned out of view of a user either behind the actual face of the clock or in a peripheral area outside the visible area of the face.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention. The embodiments were chosen and described in order to best explain the principles of the invention and the practical application, and to enable others of ordinary skill in the art to understand the invention for various embodiments with various modifications as are suited to the particular use contemplated.

It is intended that the appended claims cover all such features and advantages of the invention that fall within the spirit and scope of the present invention. As numerous modifications and changes will readily occur to those skilled in the art, it is intended that the invention not be limited to the limited number of embodiments described herein. Accordingly, it will be appreciated that all suitable variations, modifications and equivalents may be resorted to, falling within the spirit and scope of the present invention.

What is claimed is:

1. A radio receiver for use in a radio controlled clock (RCC), comprising:
    a plurality of antennas, each individual said antenna each adapted to receive a broadcast signal and generate an antenna signal therefrom;
    an antenna multiplexor operative to generate an antenna output signal from said plurality of antenna signals;
    a receiver circuit operative to receive said antenna output signal comprising a pulse width modulation (PWM)/amplitude modulation time-code broadcast signal; and
    wherein at least a first antenna is selected from the group consisting of a ferrite rod antenna, ferrite core antenna, air core coil antenna, printed inductor based antenna and semiconductor based antenna.

2. The radio receiver according to claim 1, further comprising a frame extractor operative to extract phase-modulated time information frames from the phase of said received signal.

3. The radio receiver according to claim 1, further comprising a frame extractor operative to extract time-code information frames from the amplitude/pulse-width of said broadcast signal.

4. The radio receiver according to claim 1, wherein at least a second antenna comprises a printed circuit board (PCB) based antenna.

5. The radio receiver according to claim 1, wherein at least said first antenna and at least a second antenna are positioned substantially orthogonal to each other.

6. The radio receiver according to claim 1, wherein at least said first antenna and at least a second antenna and third antennas are positioned substantially orthogonal to each other.

7. The radio receiver according to claim 1, wherein at least said first antenna is positioned substantially orthogonal to at least a printed circuit board (PCB) based second antenna.

8. The radio receiver according to claim 1, wherein at least said first antenna and at least a second antenna comprise an 'L' shaped ferrite with a winding on each leg thereof.

9. The radio receiver according to claim 1, wherein at least said first antenna and at least a second antenna comprise a single hexahedron shaped ferrite core having overlapping orthogonal windings on two dimensions thereof such that the entire mass of said ferrite is used for both orthogonal directions of magnetic flux.

10. The radio receiver according to claim 1, wherein at least said first antenna and at least a second and third antennas comprise a three dimensional 'L' shaped ferrite with a winding on all three legs thereof.

11. The radio receiver according to claim 1, wherein at least said first antenna and at least a second and third antennas comprise a single hexahedron shaped ferrite having overlapping orthogonal windings in each of three dimensions thereof such that the entire mass of said ferrite is used for three orthogonal directions of magnetic flux.

12. The radio receiver according to claim 1, wherein at least a second antenna comprises an air core flat form factor coils.

13. The radio receiver according to claim 1, wherein at least a second antenna comprises an air core antenna incorporating a wire wound around the face of a vertically mounted clock.

14. The radio receiver according to claim 1, wherein said antenna multiplexor is operative to select one of said antenna signals based on a maximum signal to noise and interference ratio (SNIR) criterion.

15. The radio receiver according to claim 1, wherein said antenna multiplexor is operative to combine said antenna signals as a function of SNIR conditions experienced in each of the antennas.

16. The radio receiver according to claim 1, wherein said antenna multiplexor further comprises a controller operative to store an indication of which of said antennas was optimal over a period of time and to select that antenna a majority of the time.

17. The radio receiver according to claim 1, wherein at least said first antenna and at least a second antenna share a ferrite core incorporating at least one capacitor embedded therein that functions as part of a resonant circuit.

18. A radio receiver method for use in a radio controlled clock (RCC), said method comprising:
providing a plurality of substantially-orthogonally positioned antennas, each individual said antenna adapted to receive the same broadcast signal and generate an antenna signal therefrom;
generating an antenna output signal from said plurality of antenna signals;
receiving said antenna output signal comprising a pulse width modulation (PWM)/amplitude modulated, time-code broadcast signal encoded with time information frames;
extracting said time-code or said time information frames from said received signal; and
wherein at least a first antenna is selected from the group consisting of a ferrite rod antenna, ferrite core antenna, air core coil antenna, printed inductor based antenna and semiconductor based antenna.

19. The method according to claim 18, further comprising selecting one of said antenna signals based on a signal to noise and interference ratio (SNIR) conditions experienced in each of the antennas.

20. The method according to claim 18, further comprising combining said antenna signals as a function of maximum signal to noise and interference ratio (SNIR).

21. The method according to claim 18, further comprising periodically selecting each of said plurality of antennas.

22. The method according to claim 18, further comprising selecting each of said plurality of antennas at predetermined times.

23. A radio receiver for use in a radio controlled clock (RCC), comprising:
a first antenna adapted to receive a broadcast signal;
a second antenna adapted to receive said broadcast signal, said second antenna oriented substantially orthogonal to said first antenna;
a receiver circuit operative to receive a signal from said first antenna and said second antenna comprising a broadcast signal encoded with time information frames;
a frame extractor operative to extract said time information frames from said received signal; and
wherein said first antenna is selected from the group consisting of a ferrite rod antenna, ferrite core antenna, air core coil antenna, printed inductor based antenna and semiconductor based antenna.

24. The radio receiver according to claim 23, wherein said receiver circuit further comprises a controller operative to store an indication of which of said first and second antennas was optimal over a period of time and to select that antenna a majority of the time.

25. The radio receiver according to claim 23, wherein said second antenna is selected from the group comprising ferrite rod antenna, ferrite core antenna, air core coil antenna, printed circuit board (PCB) inductor based antenna and semiconductor based antenna.

26. The radio receiver according to claim 23, wherein said first and second antennas share a single ferrite core having multiple windings thereon wherein none of the windings share a common axis and thus have different null orientations.

27. The radio receiver according to claim 26, wherein said first antenna and said second antenna comprise a shared core with resonating capacitors incorporated therein.

28. The radio receiver according to claim 23, wherein said first and second antennas comprise an 'L' shaped ferrite with a winding on each leg of said 'L'.

29. The radio receiver according to claim 23, further comprising a controller operative to select the signal generated by said first antenna and said second antenna as a function of maximum signal to noise and interference ratio (SNIR).

30. The radio receiver according to claim 23, further comprising a controller operative to generate a combined antenna signal as a linear combination of the signals generated by said first and second antennas.

31. A radio receiver for use in a radio controlled clock (RCC), comprising:
a first antenna input adapted to receive a broadcast signal encoded with time information from a first antenna coupled thereto;
a second antenna input adapted to receive said broadcast signal from a second antenna coupled thereto;
a multiplexor coupled to and operative to select either of said first antenna input or said second antenna input in accordance with a control signal;
a receiver circuit operative to receive the output of said multiplexor and to generate an output signal therefrom;

a decoder coupled to said receiver and operative to extract said time information from said output signal;

a controller operative configure said multiplexor to couple said first antenna input to said receiver circuit and to toggle to the second antenna input in the event reception fails using the first antenna input; and wherein said first antenna is selected from the group consisting of a ferrite rod antenna, ferrite core antenna, air core coil antenna, printed inductor based antenna and semiconductor based antenna.

32. The radio receiver according to claim 31, wherein said controller never switches said multiplexor to said second antenna input if reception through said first antenna is repeatedly successful.

33. The radio receiver according to claim 31, wherein said controller never switches said multiplexor to said second antenna input as long as reception through said first antenna is repeatedly successful.

34. The radio receiver according to claim 33, wherein said receiver never determines which antenna experiences superior reception.

35. The radio receiver according to claim 31, wherein said controller is operative to select an antenna arbitrarily at startup.

36. The radio receiver according to claim 31, wherein said controller is operative to select the antenna associated with the previous successful reception and only toggles to the other antenna in response to a reception failure.

\* \* \* \* \*